US012751573B2

(12) United States Patent
Rodriguez et al.

(10) Patent No.: US 12,751,573 B2
(45) Date of Patent: Oct. 6, 2026

(54) COOKING APPARATUS WITH INNER PAN SUSPENDED WITHIN OUTER PAN

(71) Applicant: Jerry L. Rodriguez, Orlando, FL (US)

(72) Inventors: Jerry L. Rodriguez, Orlando, FL (US); Alexandra Rausch, Charlotte, NC (US); Casey Povelones, Oak Hill, WV (US); Jeremy Losaw, Charlotte, NC (US); Raeshon Lamont McNeil, Charlotte, NC (US)

(73) Assignee: Jerry L. Rodriguez, Orlando, FL (US)

( * ) Notice: Subject to any disclaimer, the term of this patent is extended or adjusted under 35 U.S.C. 154(b) by 623 days.

(21) Appl. No.: 18/224,042

(22) Filed: Jul. 19, 2023

(65) Prior Publication Data

US 2024/0000261 A1 Jan. 4, 2024

Related U.S. Application Data

(63) Continuation of application No. 17/956,920, filed on Sep. 30, 2022, now abandoned.

(60) Provisional application No. 63/346,792, filed on May 27, 2022, provisional application No. 63/251,559, filed on Oct. 1, 2021.

(51) Int. Cl.

| | |
|---|---|
| ***A47J 36/00*** | (2006.01) |
| ***A47J 36/32*** | (2006.01) |
| ***A47J 37/10*** | (2006.01) |
| ***A47J 45/06*** | (2006.01) |
| ***G01G 3/14*** | (2006.01) |
| ***G01G 23/18*** | (2006.01) |
| ***G01K 1/02*** | (2021.01) |
| ***G01K 7/02*** | (2021.01) |

(52) U.S. Cl.
CPC ............... *A47J 36/32* (2013.01); *A47J 37/10* (2013.01); *A47J 45/061* (2013.01); *G01G 3/14* (2013.01); *G01G 23/18* (2013.01); *G01K 1/02* (2013.01); *G01K 7/02* (2013.01); *A47J 2202/00* (2013.01); *G01K 2207/02* (2013.01)

(58) Field of Classification Search
CPC ................................. A47J 36/32; A47J 37/10
See application file for complete search history.

(56) References Cited

U.S. PATENT DOCUMENTS

| | | | | |
|---|---|---|---|---|
| 6,578,469 | B2 | 6/2003 | Sharpe | |
| 10,845,774 | B2 | 11/2020 | Baxi et al. | |
| 11,339,971 | B2 * | 5/2022 | Liu | A47J 36/32 |
| 2006/0086258 | A1 | 4/2006 | Sharpe | |
| 2007/0012199 | A1 | 1/2007 | Ho et al. | |

(Continued)

FOREIGN PATENT DOCUMENTS

| | | | | |
|---|---|---|---|---|
| JP | 2019070516 A | * | 5/2019 | G05B 19/042 |
| KR | 20060045645 A | * | 5/2006 | A45C 13/1084 |

*Primary Examiner* — Nicholas Krasnow

(57) ABSTRACT

A pan assembly comprises an inner pan; an outer pan; a plurality of load cells comprising strain gauge weight sensors; a temperature probe; and an electronic display screen. The pan assembly is configured to provide both weight information for contents of the pan assembly, and temperature information for the pan. The inner pan is suspended within the outer pan by the load cells. The pan assembly is configured to display a weight or mass reading based on a weight or mass measurement by the load cells and is configured to display a temperature reading based on a temperature measurement by the temperature probe.

10 Claims, 34 Drawing Sheets

(56) References Cited

U.S. PATENT DOCUMENTS

| | | | | |
|---|---|---|---|---|
| 2012/0258224 | A1* | 10/2012 | Salvino | A47J 37/108 99/449 |
| 2016/0274076 | A1* | 9/2016 | Hofleitner | A23L 5/12 |
| 2018/0333006 | A1* | 11/2018 | Bassill | A47J 36/2483 |
| 2021/0168909 | A1* | 6/2021 | Park | H05B 3/20 |
| 2021/0177197 | A1* | 6/2021 | Streeck | H05B 1/0252 |

* cited by examiner

COOKING APPARATUS WITH INNER PAN SUSPENDED WITHIN OUTER PAN

CROSS-REFERENCE TO RELATED APPLICATION

The present application hereby incorporates by reference the disclosures of: U.S. patent application publication 2020/0305643 A1; U.S. provisional patent application 62/823,890; and U.S. provisional patent application 63/251,559.

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

COMPUTER PROGRAM LISTING

Submitted concurrently herewith via the USPTO's electronic filing system, and incorporated herein by reference, are computer program files including instructions, routines, and/or other contents of several computer programs. A table setting forth the name and size of files included in the computer program listing is included below.

| File Name | Creation Date | File Size (bytes) |
|---|---|---|
| ascify.txt | May 27, 2022 8:17 | 37,473 |
| readme.txt | May 27, 2022 8:17 | 3,414 |
| video1.txt | May 27, 2022 17:47 | 18,278,000 |
| video2.txt | May 27, 2022 17:47 | 18,278,000 |
| video3.txt | May 27, 2022 17:47 | 17,910,282 |
| cpl.txt | May 27, 2022 8:17 | 3,974,110 |

One of these files, "readme.txt", contains instructions for utilizing the "ascify.txt" file for converting the other ".txt" files into one or more ".zip" files. This "ascify.txt" file represents an assembly conversion program source code for running on a Windows machine with MASM 6.11 installed. The readme file includes instructions for compiling and running this program, and instructions for converting the other text files into the one or more ".zip" files. One of the ".zip" files includes an electronic drawing file known as an "eDrawing" for an embodiment of an improved cooking apparatus in accordance with one or more aspects and features of the present invention, which can be opened on a Mac or PC using a free eDrawing viewer that is available from Dassault Systemes SolidWorks Corporation. The other ".zip" file includes a ".mp4" video that can be opened with many different applications on a Mac or PC.

BACKGROUND OF THE INVENTION

The invention generally relates to cooking apparatus and, in particular, cooking apparatus in which a weight of food added to the cooking apparatus is measured by the apparatus while cooking. The cooking apparatus preferably is the form of a pan assembly and comprises an inner pan and an outer pan. Aspects and features thereof, as disclosed below and in the drawings, are believed to represent improvements in cooking apparatus, such as those in the disclosures of the incorporated '643 publication and '890 application.

SUMMARY OF THE INVENTION

The invention includes many aspects and features. Moreover, while many aspects and features relate to, and are described in, the context of cooking food, the invention is not limited to such use as will become apparent from the following summaries and detailed descriptions of aspects, features, and one or more embodiments of the invention.

A first aspect relates to a pan assembly comprising an inner pan; an outer pan; two load cells, each load cell comprising a strain gauge weight sensor; a temperature probe; an electronic display screen; a power button; a tare button; a measurement toggle button; a battery compartment; and a handle comprising an opening defined therethrough dimensioned and positioned for hanging of the pan assembly by the opening. The inner pan and outer pan are coupled together and positioned and dimensioned such that an exterior bottom of the inner pan is less than two millimeters, and preferably one millimeter, from an exterior bottom of the pan assembly; the two load cells are positioned and configured to measure a weight or mass of objects placed in the inner pan; the temperature probe is configured to measure a temperature of the inner pan; the tare button is configured to zero out measurement with the two load cells; the electronic display screen is configured to display a weight or mass reading based on a weight or mass measurement by the load cells; the electronic display screen is configured to display a temperature reading based on a temperature measurement by the temperature probe; and the measurement toggle button is configured to toggle between display of a temperature reading and display of a weight or mass reading.

In a feature of this aspect, the pan assembly is configured to display a temperature reading on a plurality of scales.

In a feature of this aspect, the pan assembly is configured to display a temperature reading on a Celsius scale.

In a feature of this aspect, the pan assembly is configured to display a temperature reading on a Fahrenheit scale.

In a feature of this aspect, the pan assembly is configured to display a weight or mass reading in a plurality of units.

In a feature of this aspect, the pan assembly is configured to display a weight or mass reading in ounces.

In a feature of this aspect, the pan assembly is configured to display a weight or mass reading in pounds.

In a feature of this aspect, the pan assembly is configured to display a weight or mass reading in grams.

In a feature of this aspect, the pan assembly includes a scale or unit toggle button for toggling between different scales or units.

In a feature of this aspect, the pan assembly comprises a plastic perimeter surrounding a cooking area of the pan assembly which houses electrical components and wires.

In a feature of this aspect, the temperature probe is a thermocouple.

In another aspect, a pan assembly comprises: an inner pan; an outer pan; and one or more load cells. The inner pan is suspended within the outer pan by the load cells and is configured to measure weight of one or more items placed within the pan assembly for cooking.

In a feature, the inner pan is suspended above the outer pan by the load cells.

In a feature, the inner pan is connected to the outer pan only by the load cells.

In accordance with one or more preferred implementations, a load cell is secured to a bottom of a top casing portion and a top of an outer portion of an inner pan, and insertion of an object into the inner pan applies downward force to the inner pan which causes lowering of the outer portion of the inner pan and downward pulling of the load cell.

In accordance with one or more preferred implementations, an outer portion of an inner pan pivots about a pivot point such that when an object is inserted into the inner pan which applies downward force to the inner pan and causes lowering of the pan portion of the inner pan, the outer portion of the inner pan instead translates upward, applying force to a load cell disposed thereat.

Additional aspects and features are found in the incorporated disclosures identified above.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

DETAILED DESCRIPTION

Figure 1:
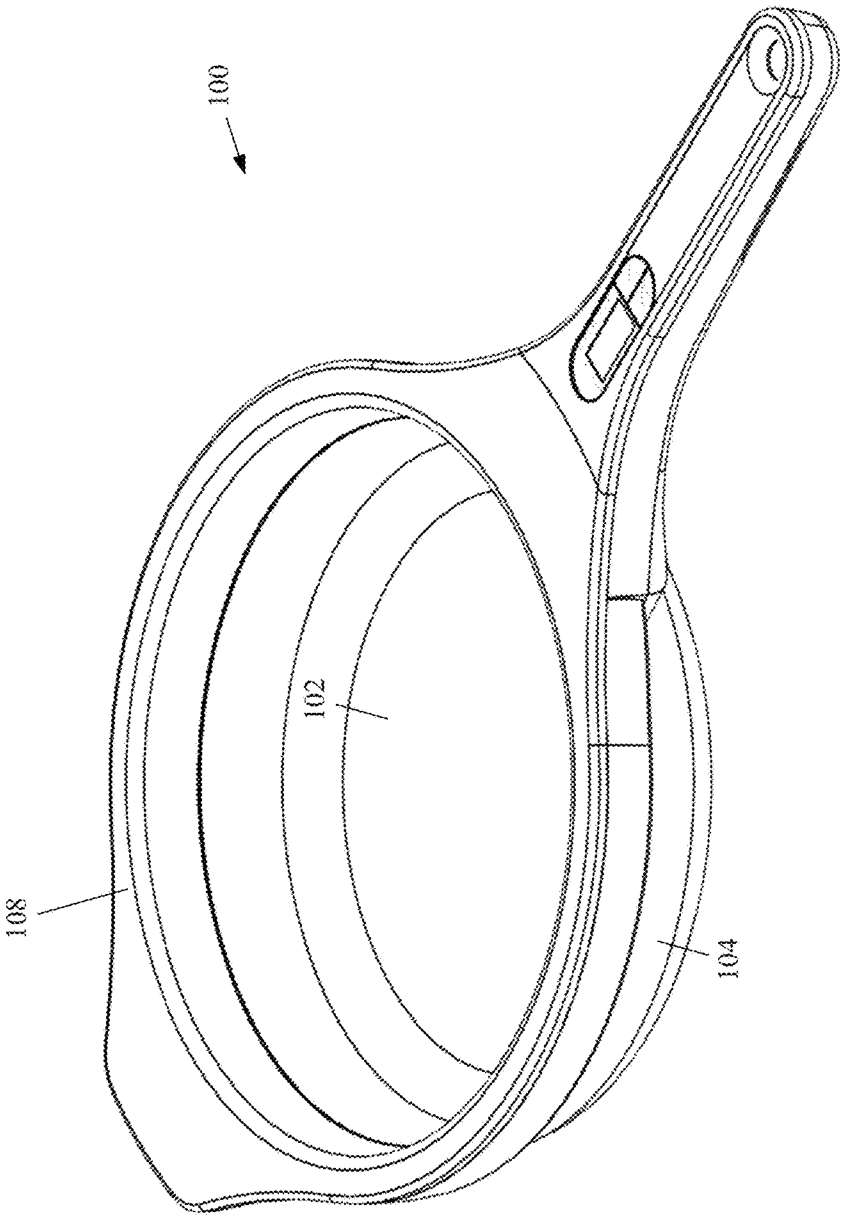
FIG. 1 is an isometric perspective view of a preferred embodiment of the invention in the form of a pan assembly 100 in accordance with one or more aspects and features.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

In accordance with one or more preferred implementations, a pan assembly is configured to provide measurement data for use of the pan assembly. In accordance with one or more preferred implementations, a pan assembly is configured to provide weight information for contents of the pan assembly. In accordance with one or more preferred implementations, a pan assembly is configured to provide temperature information for the pan. In accordance with one or more preferred implementations, a pan assembly is configured to provide both weight information for contents of the pan assembly, and temperature information for the pan.

In accordance with one or more preferred implementations, a pan assembly comprises inner and outer pans coupled together to create a scale system, and one or more load cells with one or more strain gauge weight sensors configured to determine a weight or mass of contents in the inner pan. In accordance with one or more preferred implementations, an actuating inner pan is triggered by weight, e.g., triggered by weight to obtain sensor measurements.

In accordance with one or more preferred implementations, a pan assembly comprising inner and outer pans is sized, dimensioned, and configured such that a bottom of the inner pan will be one to two millimeters from a cooking surface in order to facilitate heat transfer for electric stoves.

In accordance with one or more preferred implementations, a pan assembly comprising inner and outer pans further comprises a temperature probe or thermocouple for reading a temperature of the inner pan.

In accordance with one or more preferred implementations, a pan assembly comprises an electronic display screen configured to display a weight or mass readout in a variety of units, e.g., ounces, pounds, grams, etc.

In accordance with one or more preferred implementations, a pan assembly comprises an electronic display screen configured to display a temperature readout on a variety of scales, e.g., Fahrenheit or Celsius.

In accordance with one or more preferred implementations, a pan assembly comprises a power button, a tare button configured to tare a scale of the pan assembly, and a measurement toggle button for toggling between weight and temperature settings or display.

In accordance with one or more preferred implementations, a pan assembly comprises a battery compartment or battery housing configured to receive replaceable batteries, e.g., AA batteries.

In accordance with one or more preferred implementations, a pan assembly comprises a hole in the handle for hanging the pan assembly.

In accordance with one or more preferred implementations, a pan assembly comprises a unique plastic perimeter that houses electrical wires, e.g., a plastic perimeter surrounding a cooking area of the pan.

FIG. 1 is an isometric perspective view of a preferred embodiment of a pan assembly 100 in accordance with one or more aspects and features. The pan assembly 100 comprises an inner pan 102 and an outer pan 104.

Figure 1A:
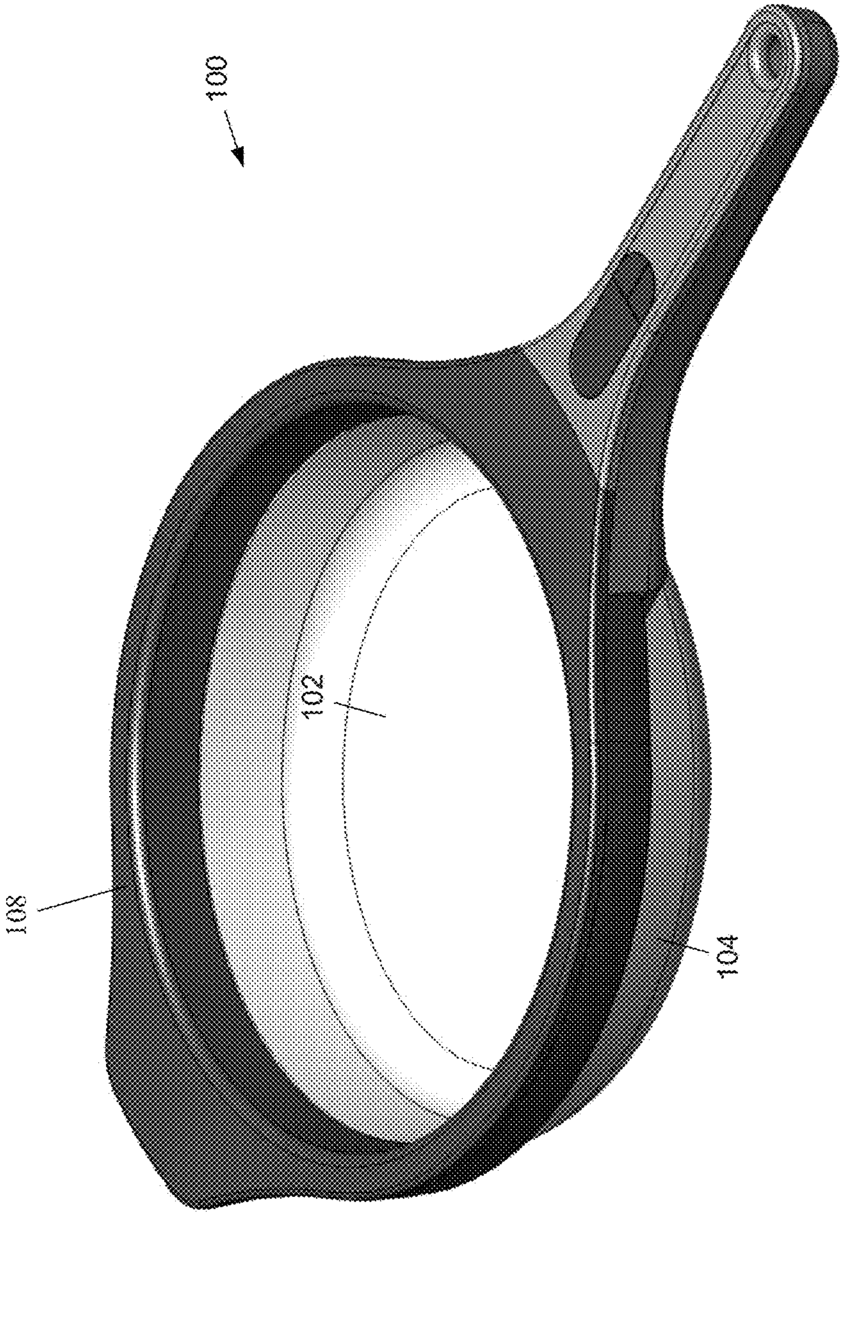
FIG. 1*a* is the isometric perspective view of FIG. 1—illustrated with shading and edges—of the pan assembly 100.
Figure 1B:
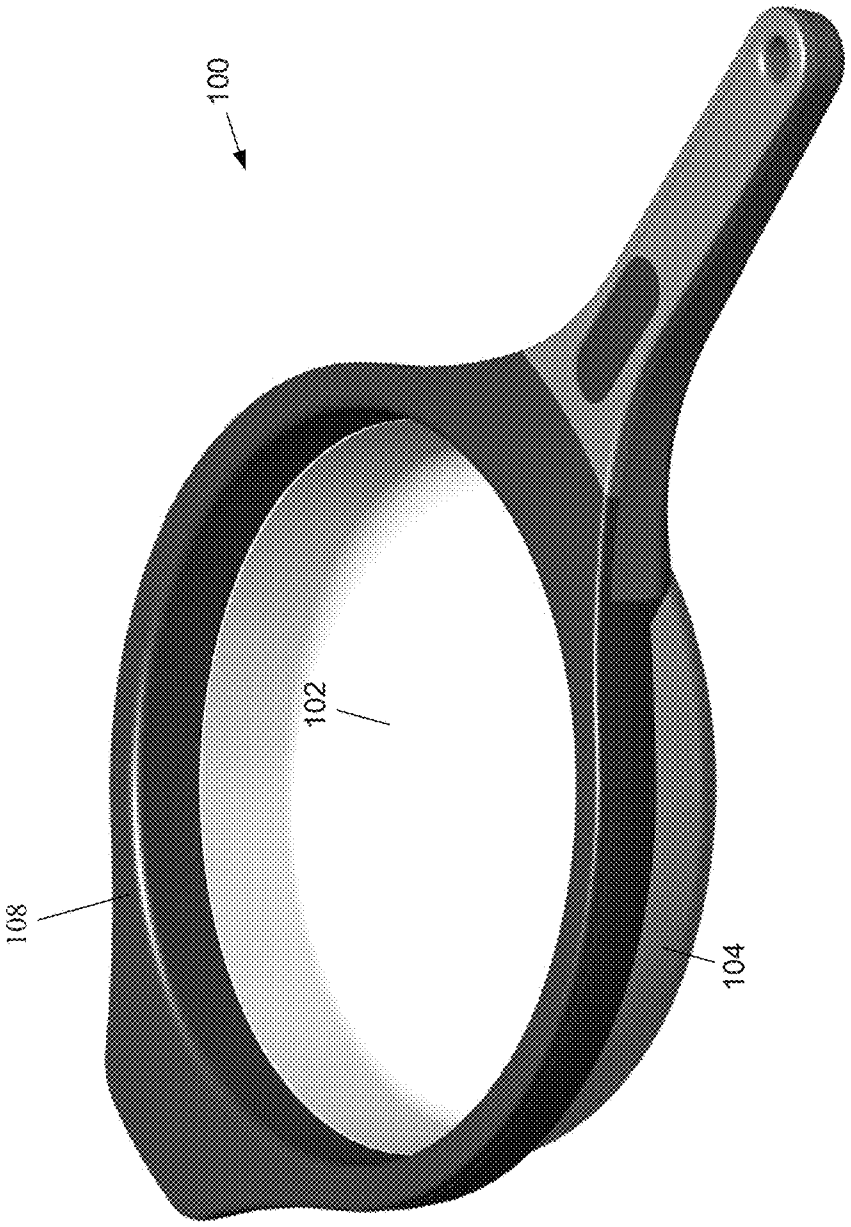
FIG. 1*b* is the isometric perspective view of FIG. 1—illustrated with shading—of the pan assembly 100.

Additionally, FIG. 1*a* is the isometric perspective view of FIG. 1—illustrated with shading and edges—of a preferred embodiment of the pan assembly 100. FIG. 1*b* is the isometric perspective view of FIG. 1—illustrated with shading—of a preferred embodiment of the pan assembly 100.

Figure 2:
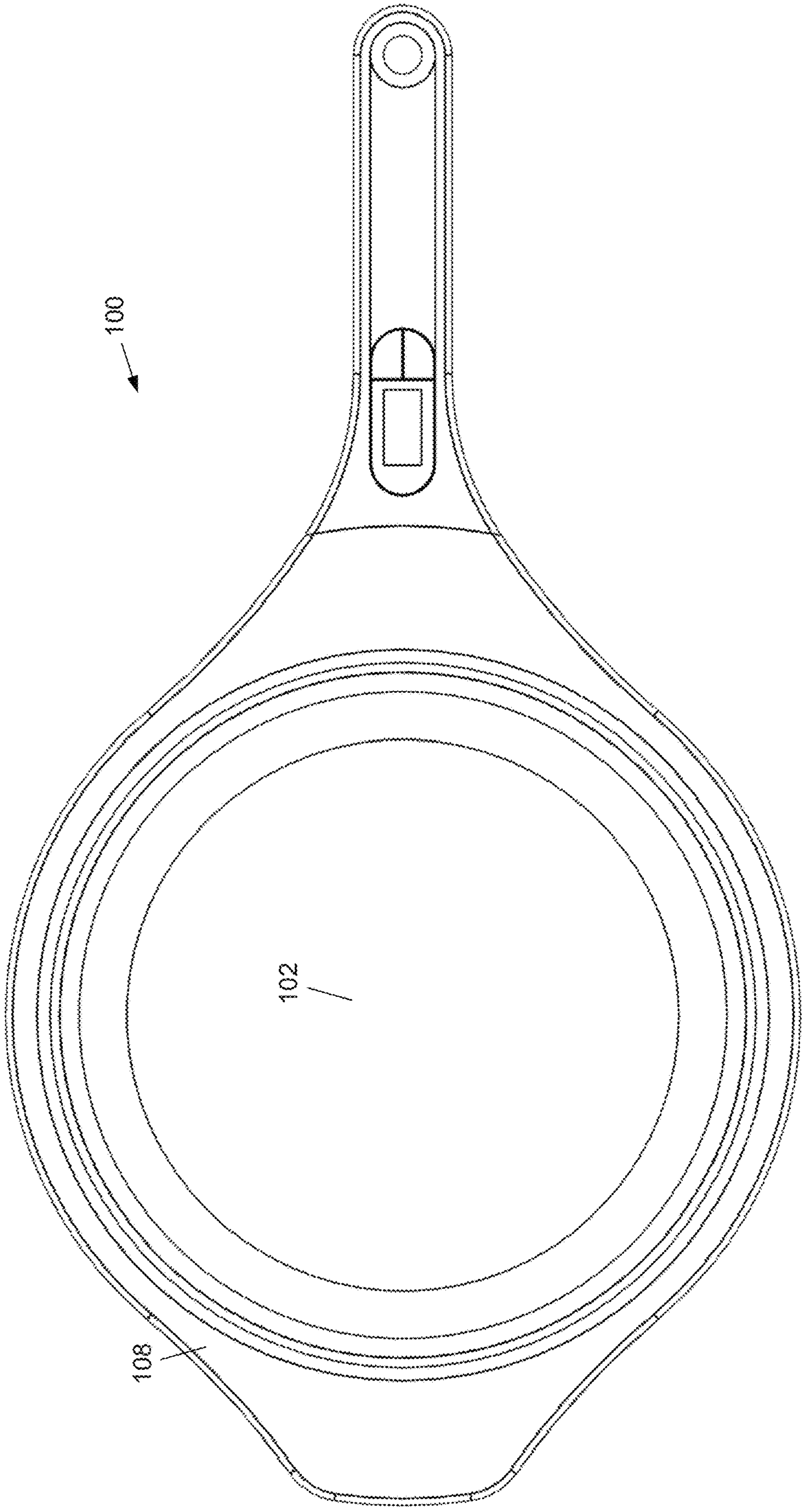
FIG. 2 is a top plan view of the pan assembly 100.

FIG. 2 is a top plan view of the pan assembly 100.

Figure 2A:
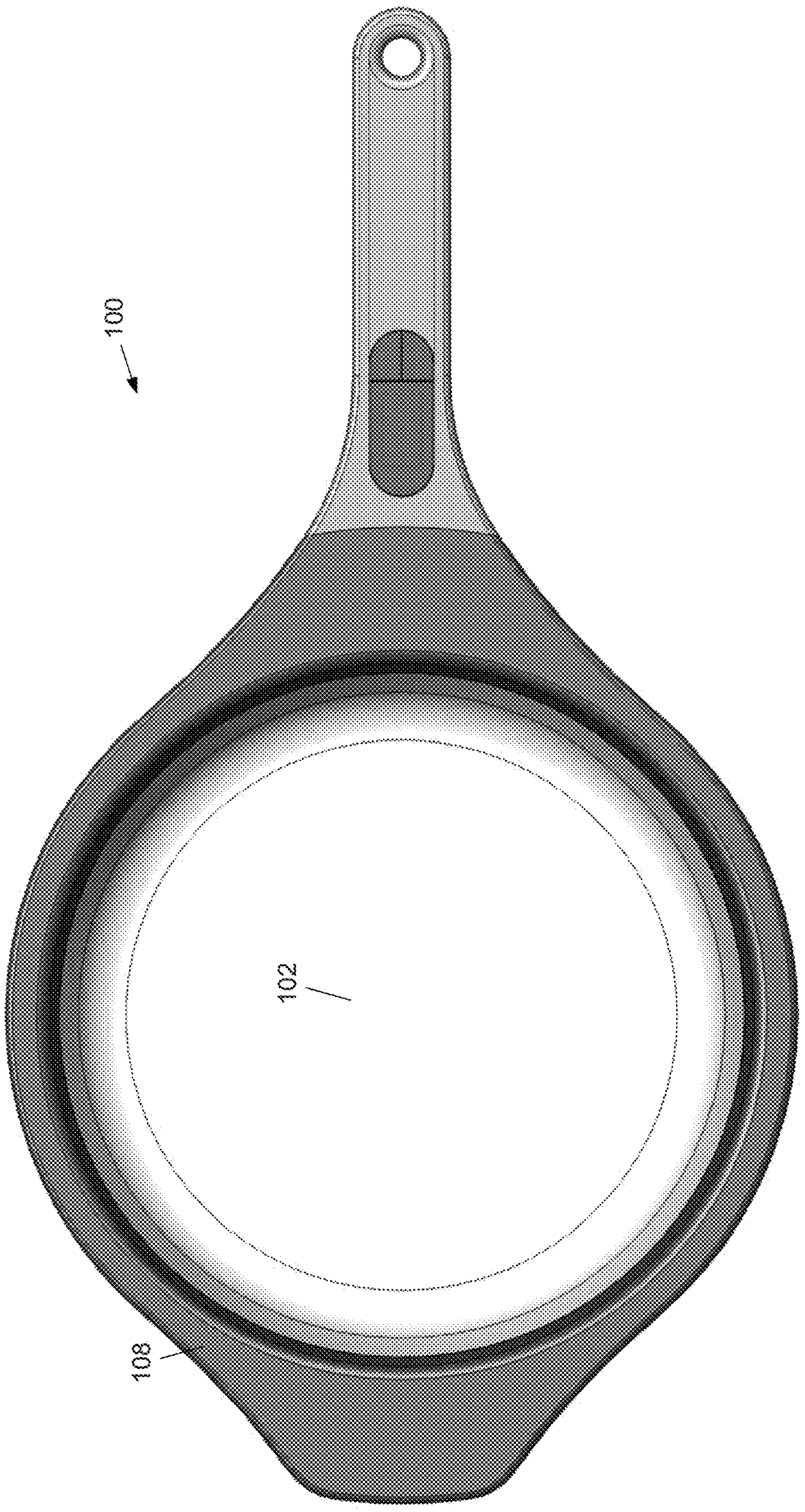
FIG. 2*a* is the top plan view of FIG. 2—illustrated with shading and edges—of the pan assembly 100.
Figure 2B:
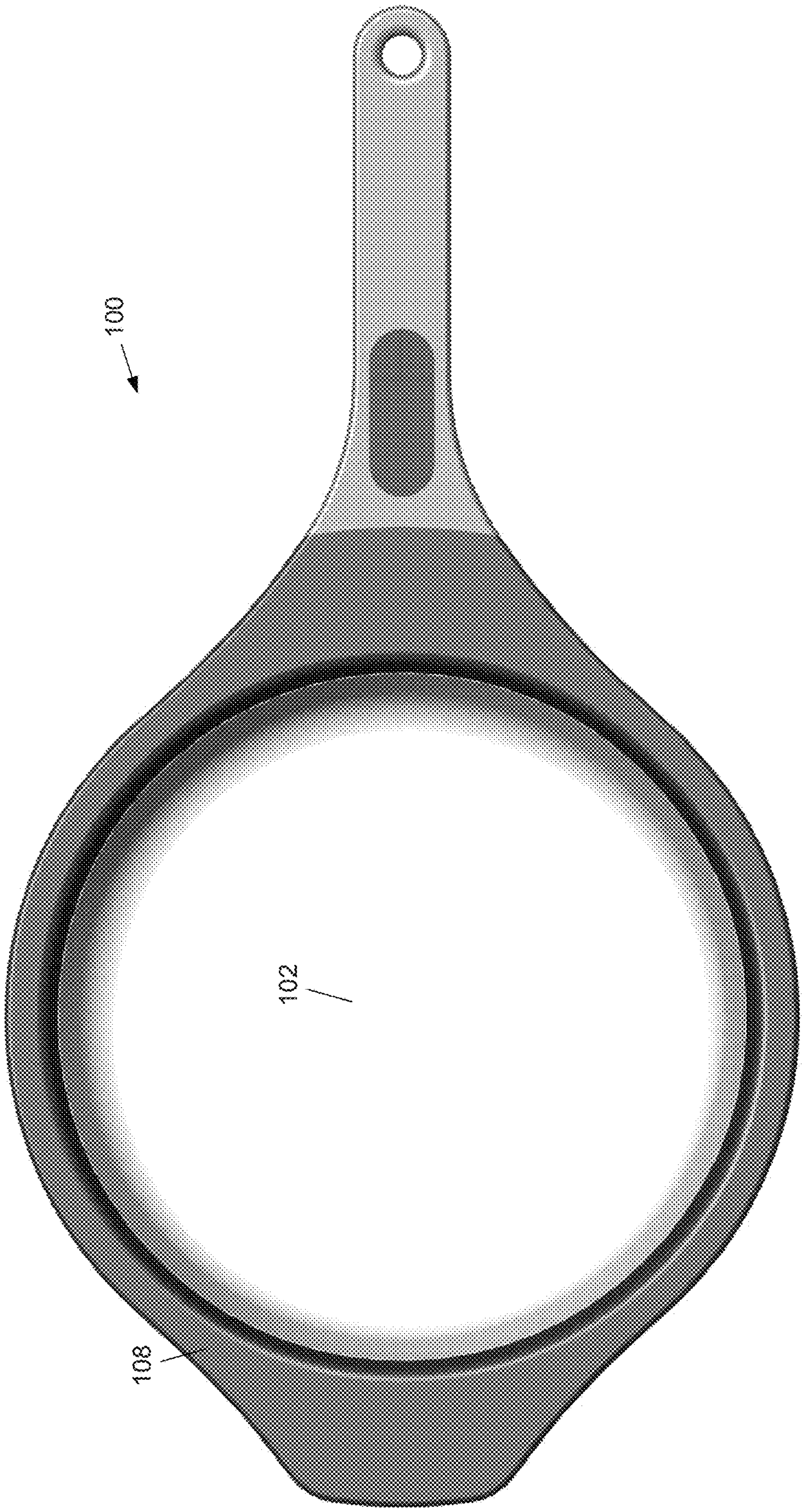
FIG. 2*b* is the top plan view of FIG. 2—illustrated with shading—of the pan assembly 100.

Additionally, FIG. 2*a* is the top plan view of FIG. 2—illustrated with shading and edges—of the pan assembly 100. FIG. 2*b* is the top plan view of FIG. 2—illustrated with shading—of the pan assembly 100.

Figure 3:
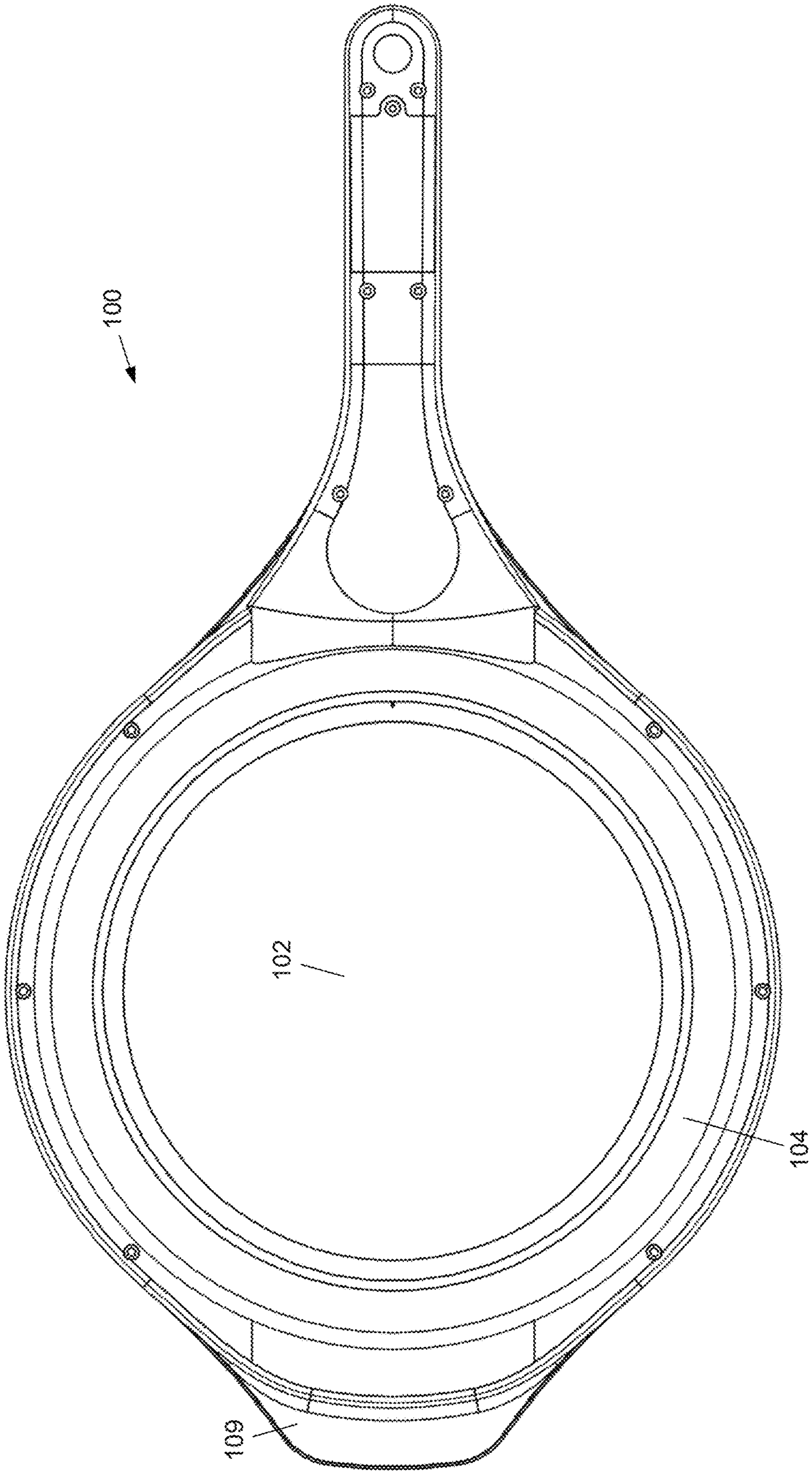
FIG. 3 is a bottom plan view of the pan assembly 100.

FIG. 3 is a bottom plan view of the pan assembly 100.

Figure 3A:
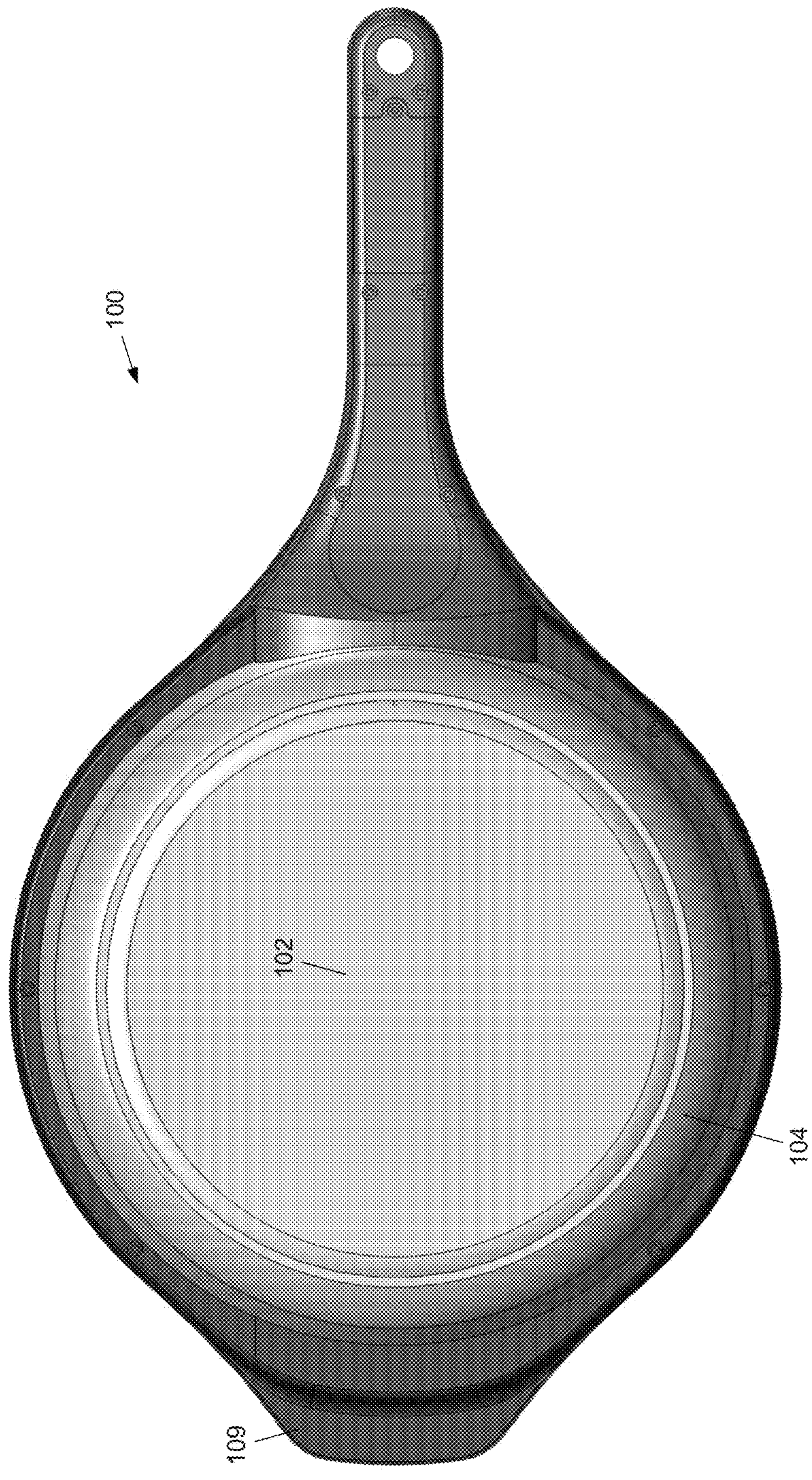
FIG. 3*a* is the bottom plan view of FIG. 3—illustrated with shading and edges—of the pan assembly 100.
Figure 3B:
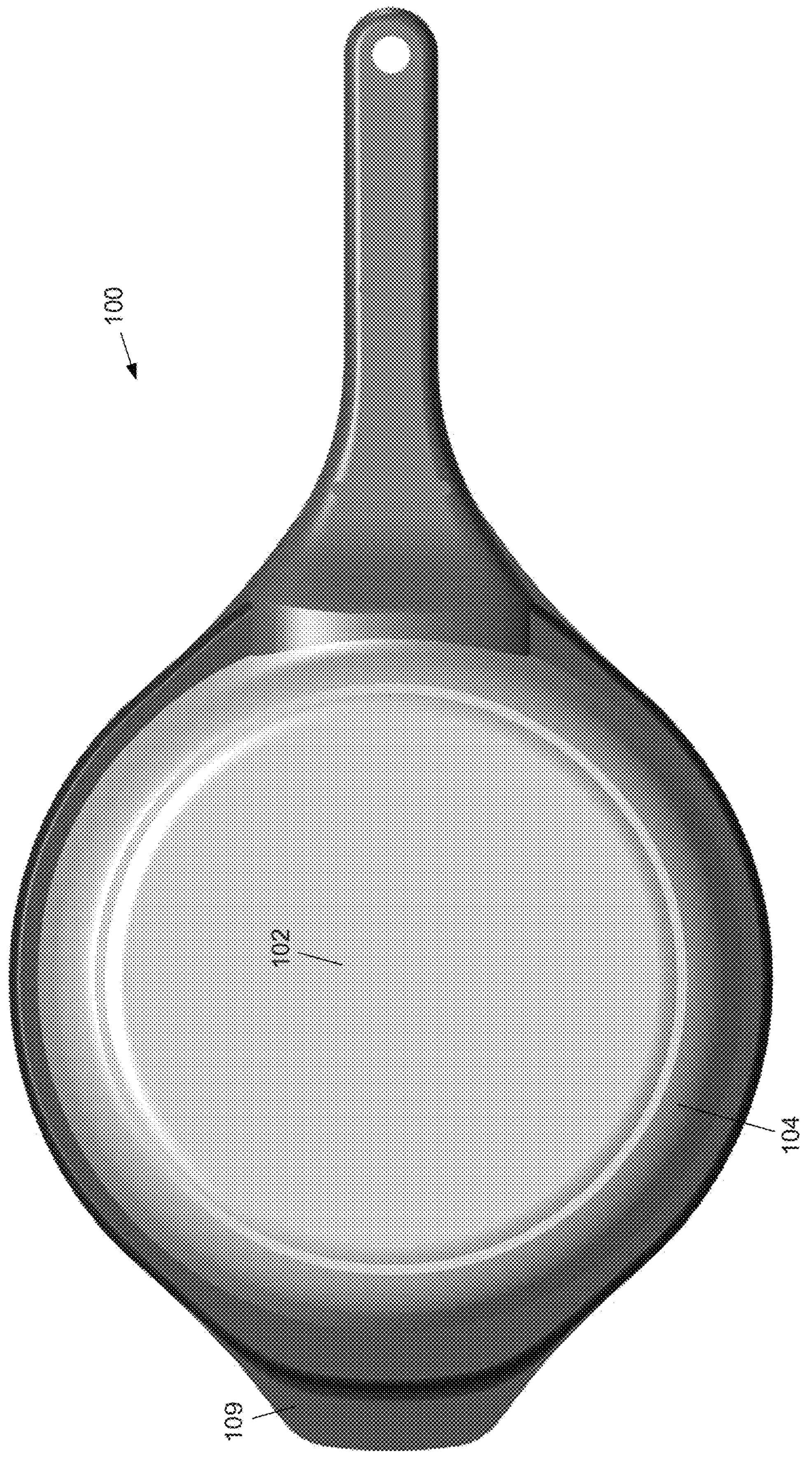
FIG. 3*b* is the bottom plan view of FIG. 3—illustrated with shading—of the pan assembly 100.

Additionally, FIG. 3*a* is the bottom plan view of FIG. 3—illustrated with shading and edges—of the pan assembly 100. FIG. 3*b* is the bottom plan view of FIG. 3—illustrated with shading—of the pan assembly 100.

Figure 4:
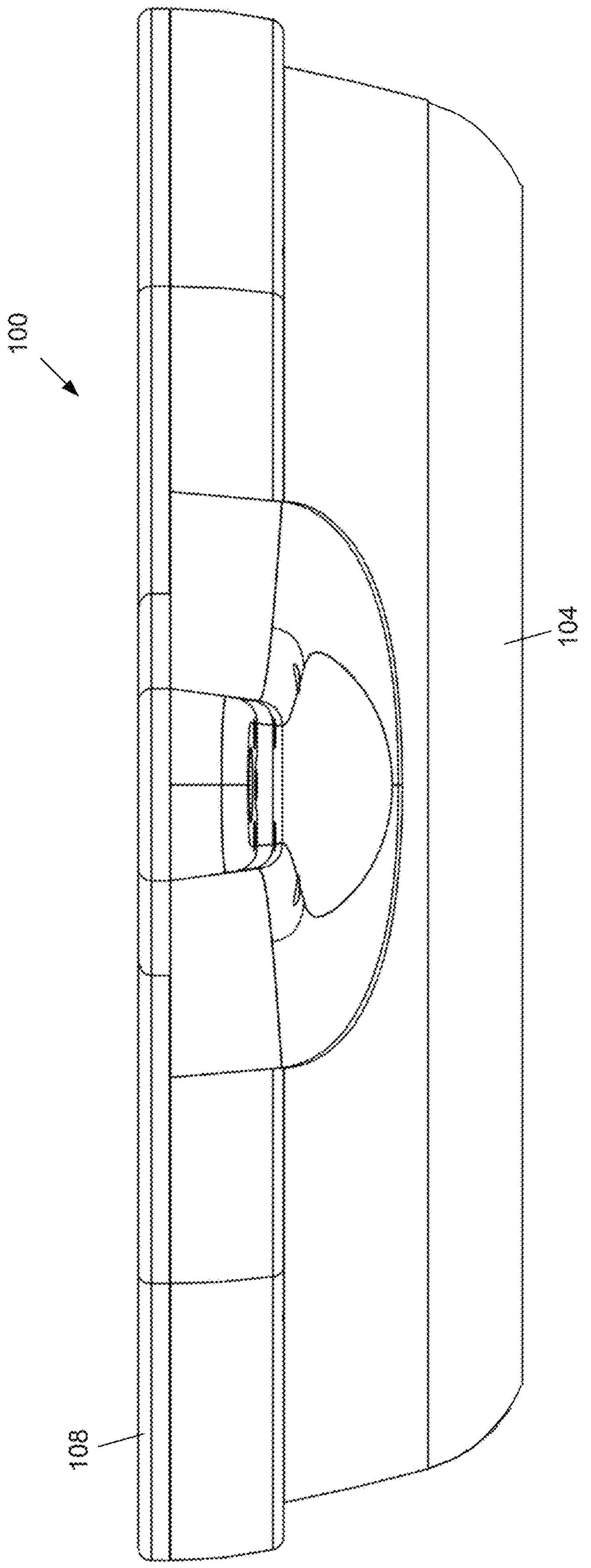
FIG. 4 is an elevational view of a rear of the pan assembly 100.

FIG. 4 is an elevational view of a rear of the pan assembly 100.

Figure 4A:
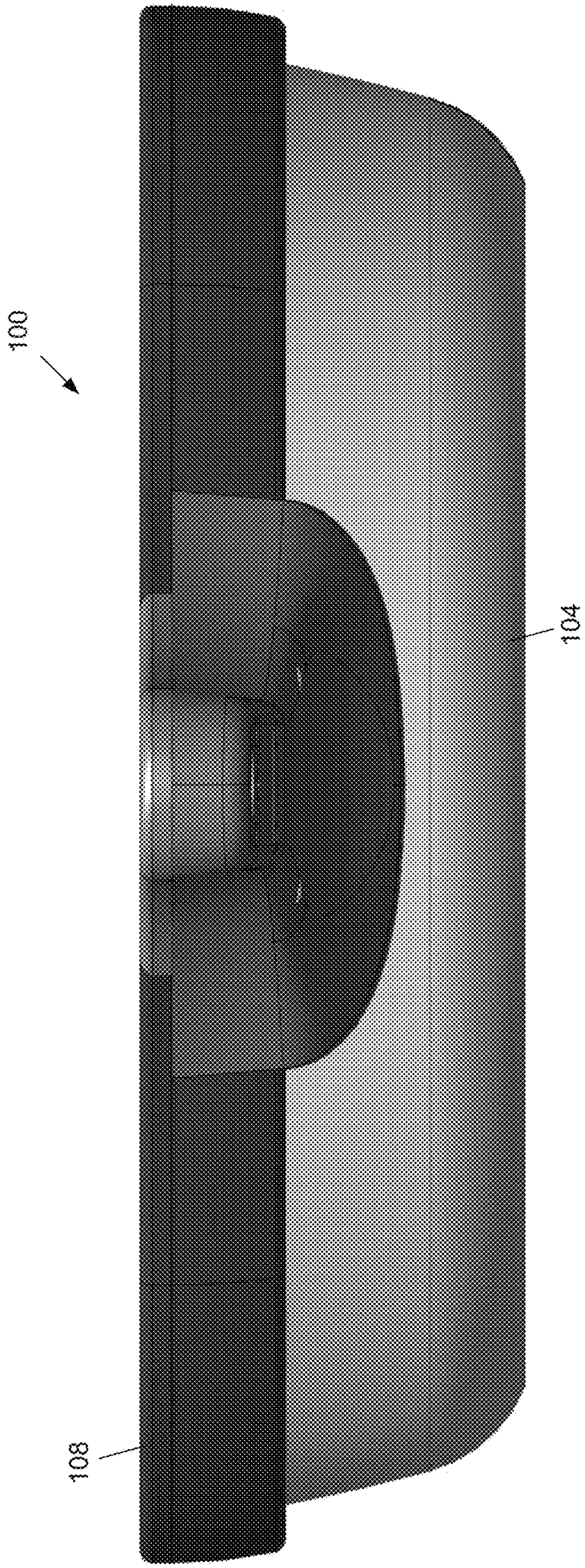
FIG. 4*a* is the elevational view of FIG. 4—illustrated with shading and edges—of the rear of the pan assembly 100.
Figure 4B:
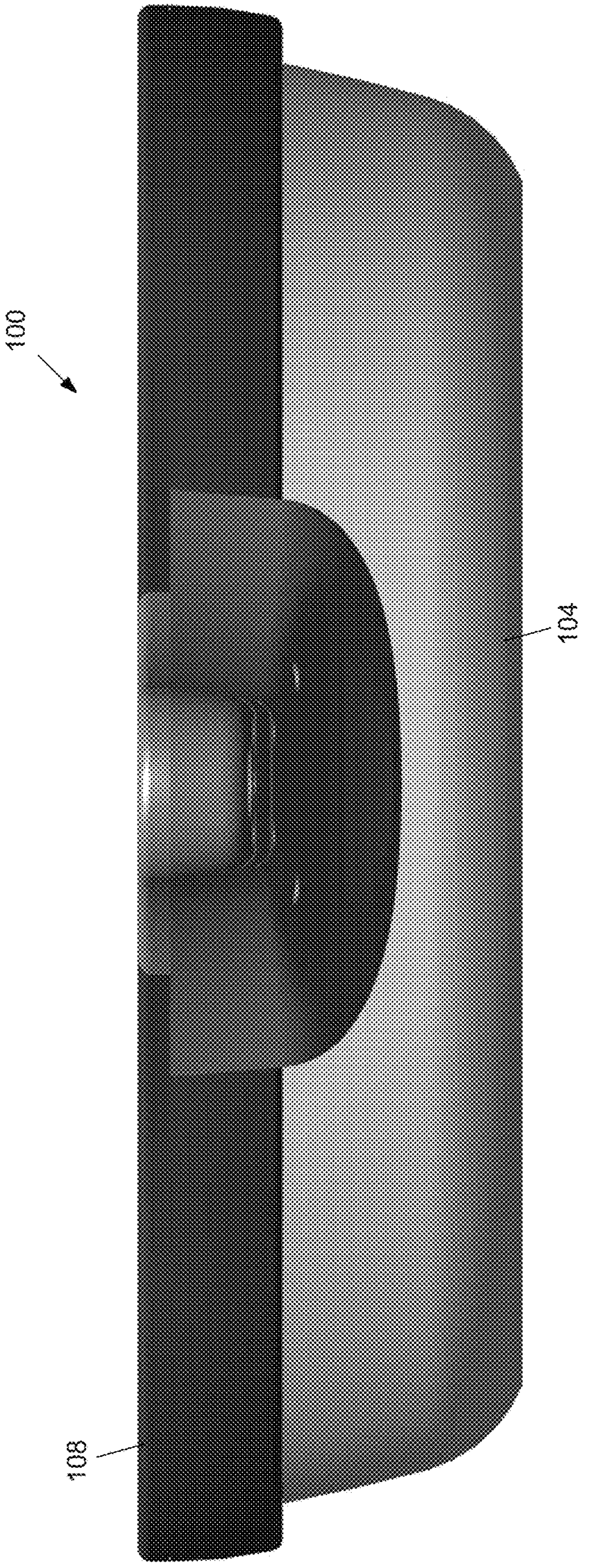
FIG. 4*b* is the elevational view of FIG. 4—illustrated with shading—of the rear of the pan assembly 100.

Additionally, FIG. 4*a* is the elevational view of FIG. 4—illustrated with shading and edges—of the rear of the pan assembly 100. FIG. 4*b* is the elevational view of FIG. 4—illustrated with shading—of the rear of the pan assembly 100.

Figure 5:
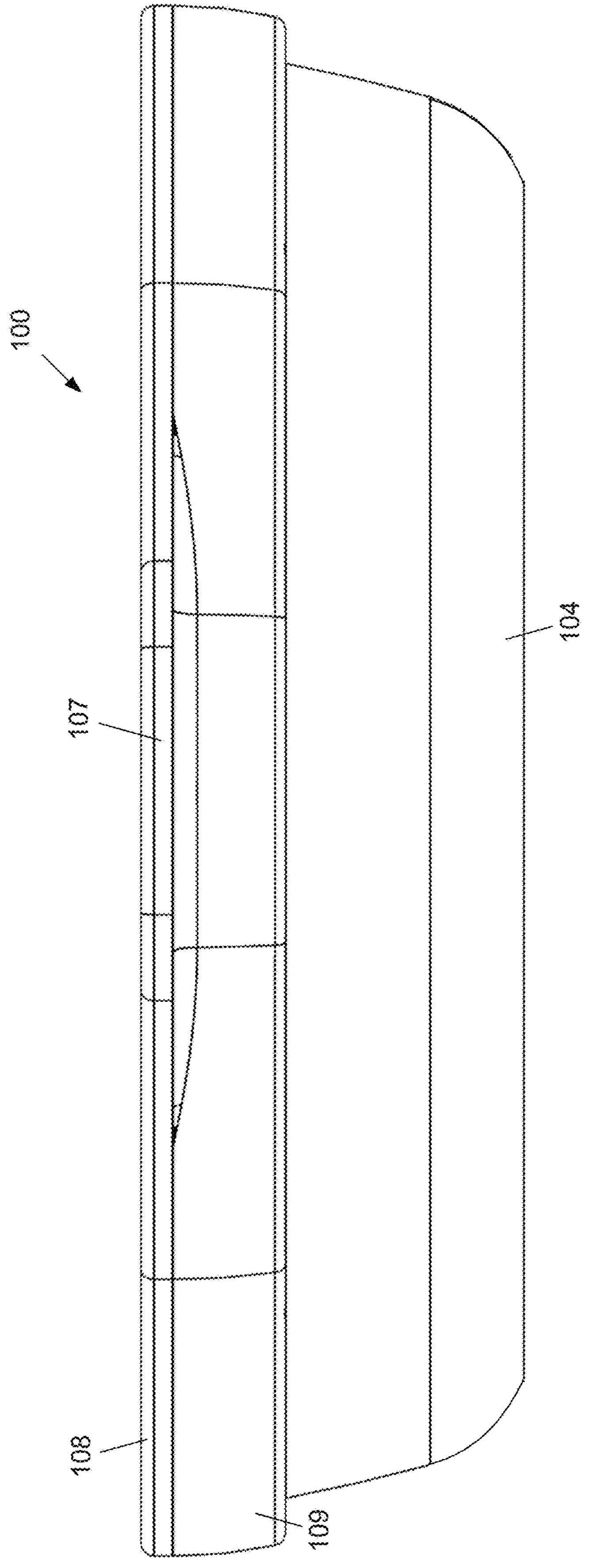
FIG. 5 is an elevational view of a front of the pan assembly 100.

FIG. 5 is an elevational view of a front of the pan assembly 100.

Figure 5A:
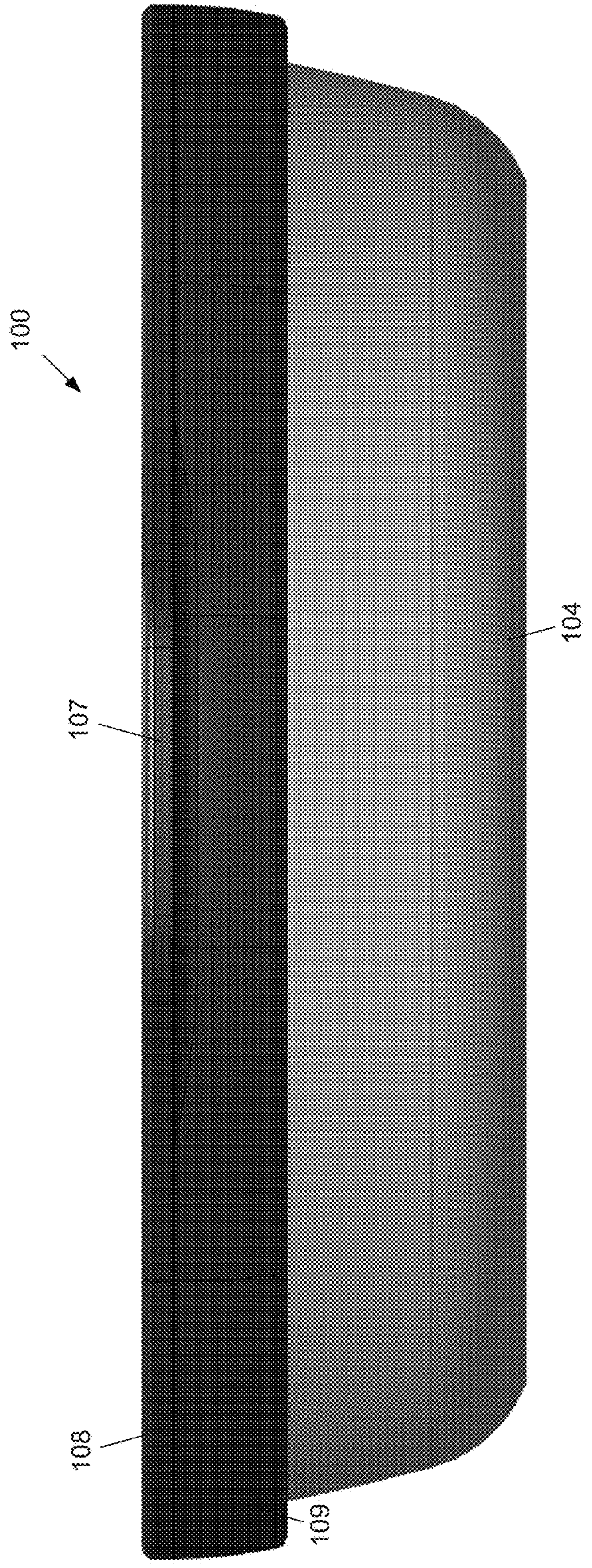
FIG. 5*a* is the elevational view of FIG. 5—illustrated with shading and edges—of the front of the pan assembly 100.
Figure 5B:
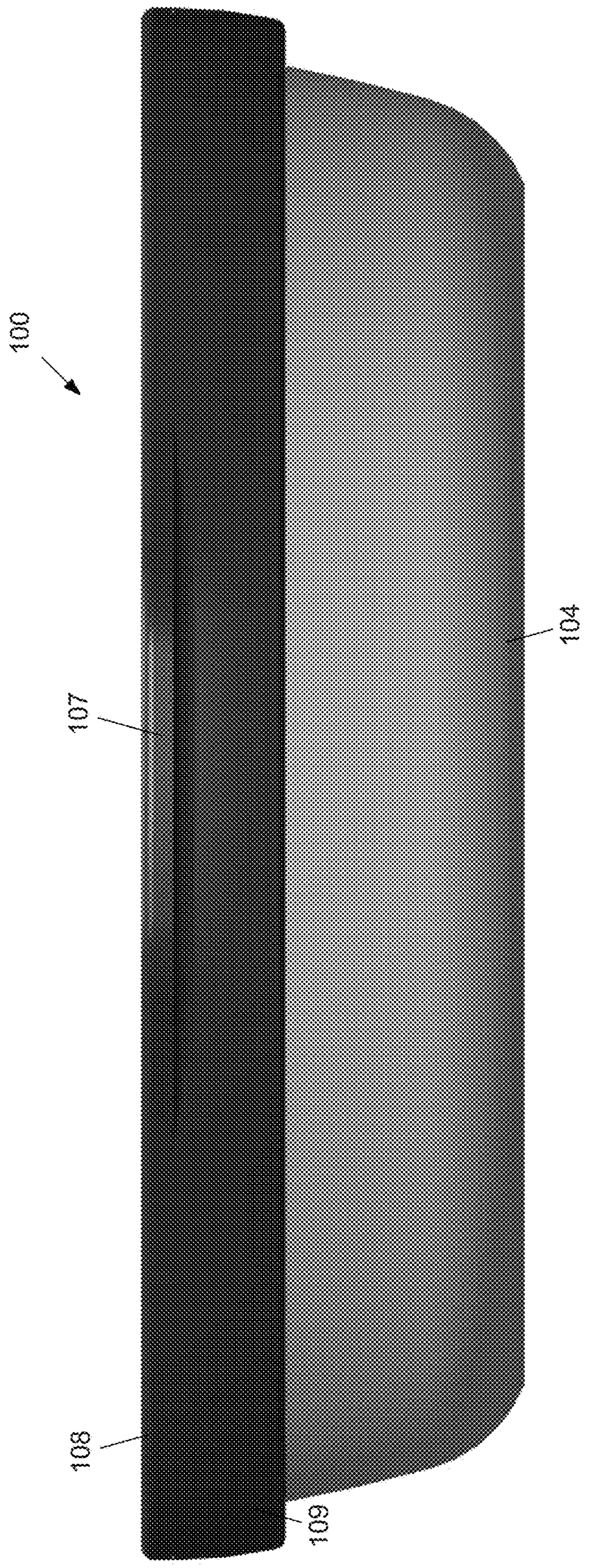
FIG. 5*b* is the elevational view of FIG. 5—illustrated with shading—of the front of the pan assembly 100.

Additionally, FIG. 5*a* is the elevational view of FIG. 5—illustrated with shading and edges—of the front of the pan assembly 100. FIG. 5*b* is the elevational view of FIG. 5—illustrated with shading—of the front of the pan assembly 100.

Figure 6:
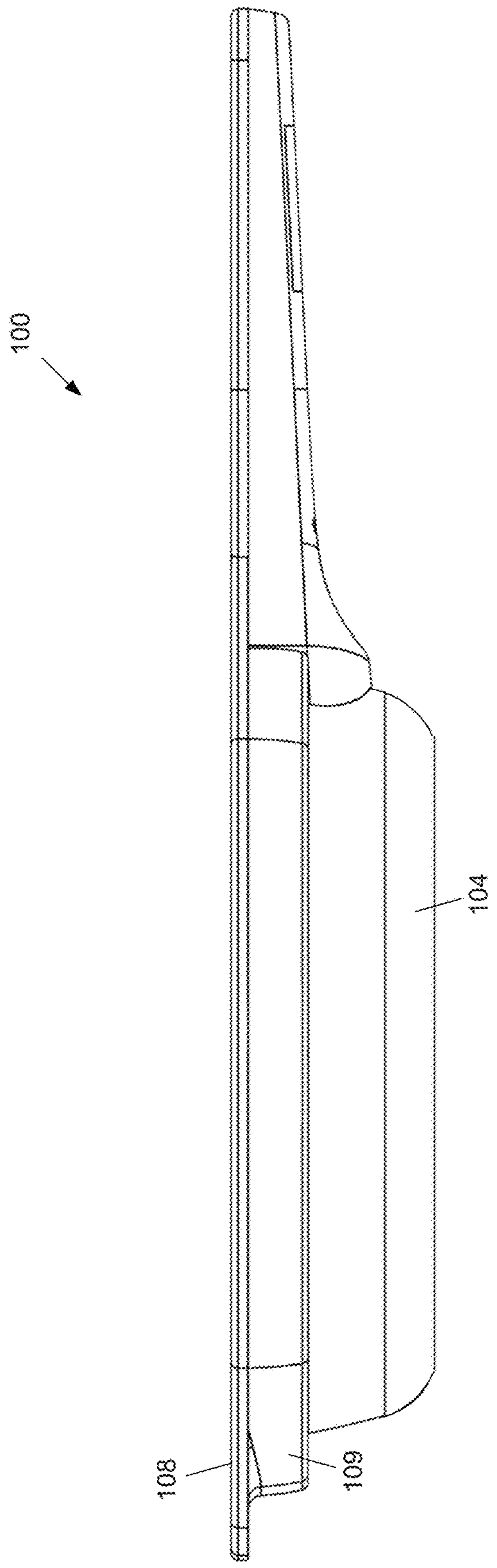
FIG. 6 is an elevational view of a first side of the pan assembly 100.

FIG. 6 is an elevational view of a first side of the pan assembly 100.

Figure 6A:
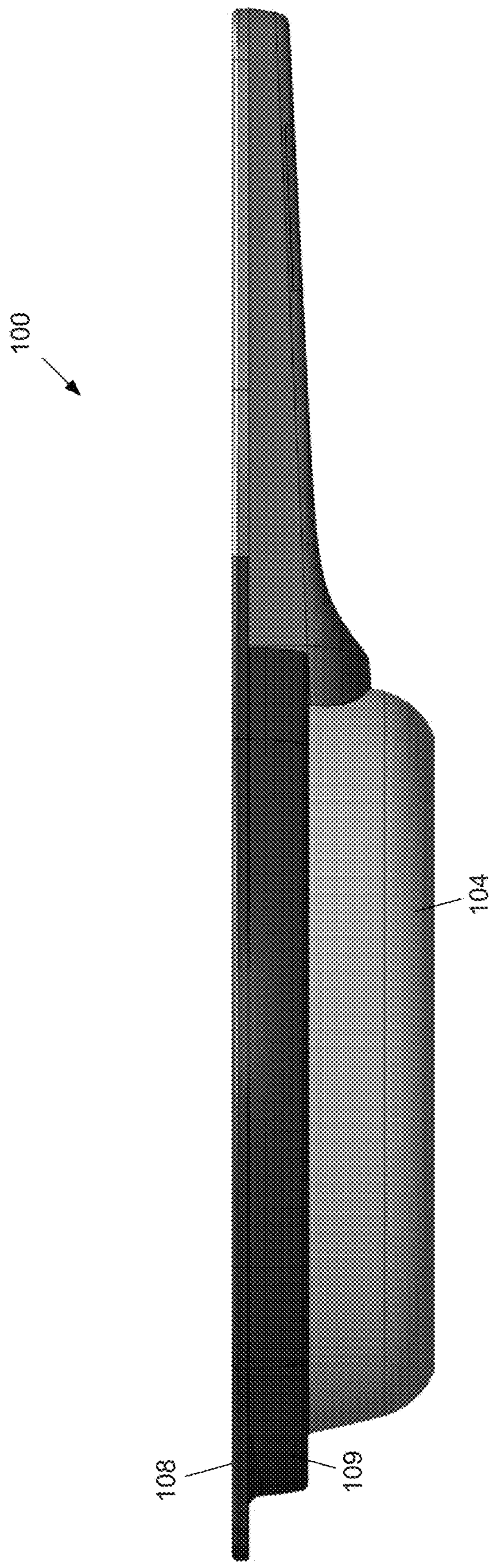
FIG. 6*a* is the elevational view of FIG. 6—illustrated with shading and edges—of the first side of the pan assembly 100.
Figure 6B:
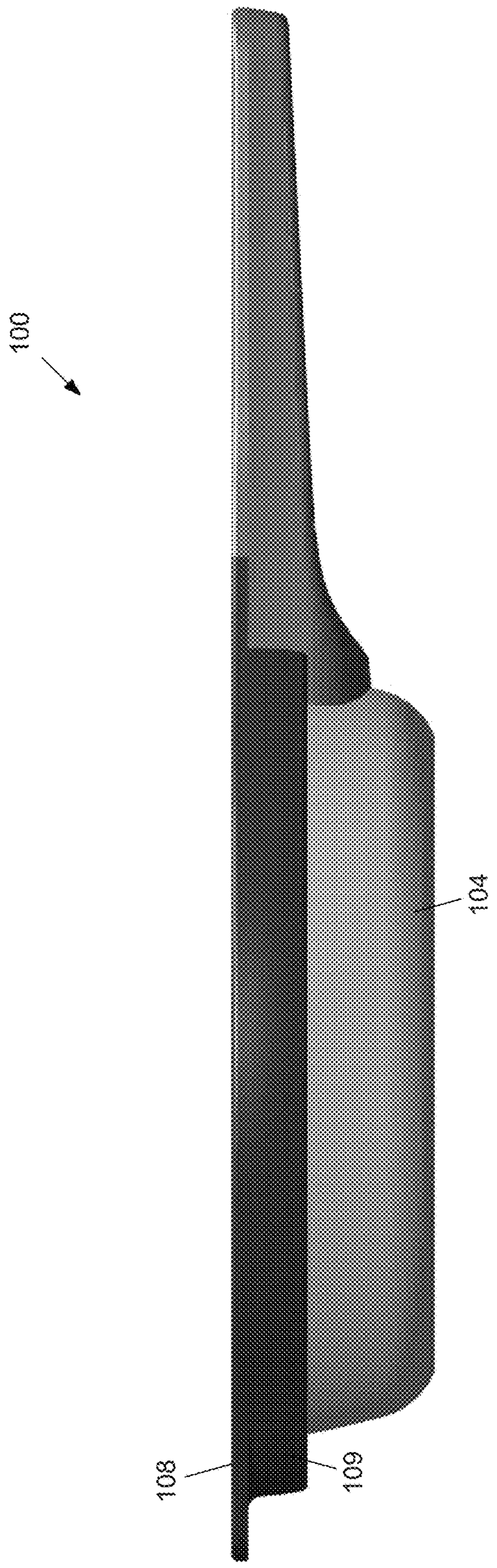
FIG. 6*b* is the elevational view of FIG. 6—illustrated with shading—of the first side of the pan assembly 100.

Additionally, FIG. 6*a* is the elevational view of FIG. 6—illustrated with shading and edges—of the first side of the pan assembly 100. FIG. 6*b* is the elevational view of FIG. 6—illustrated with shading—of the first side of the pan assembly 100.

Figure 7:
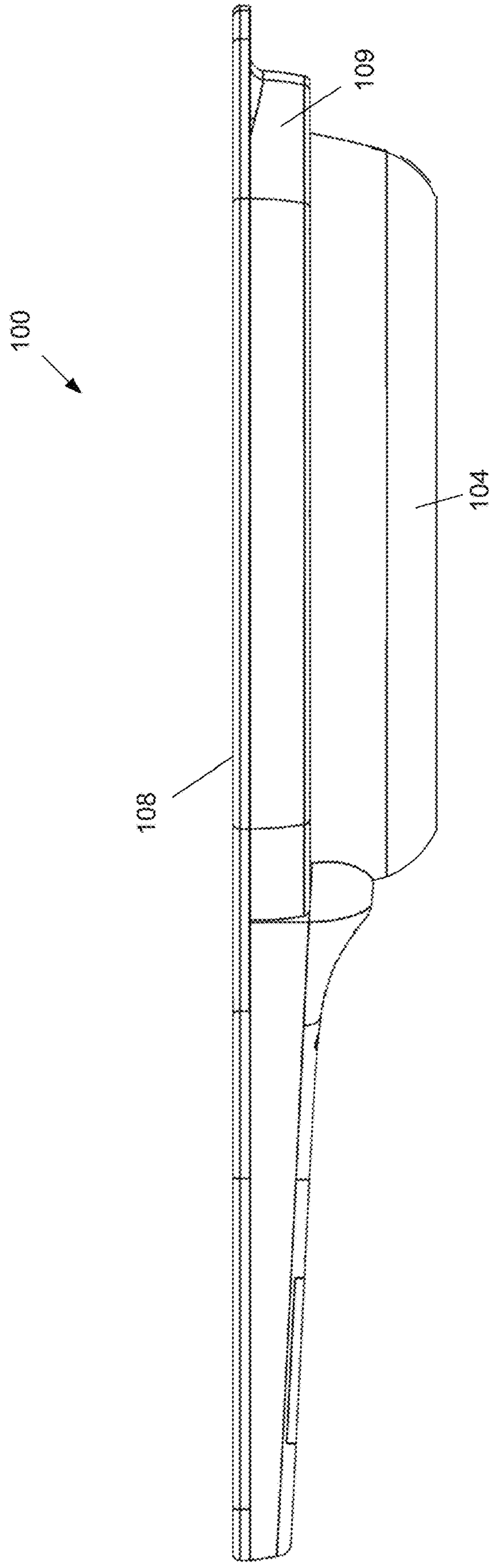
FIG. 7 is an elevational view of a second side of the pan assembly 100.

FIG. 7 is an elevational view of a second side of the pan assembly 100.

Figure 7A:
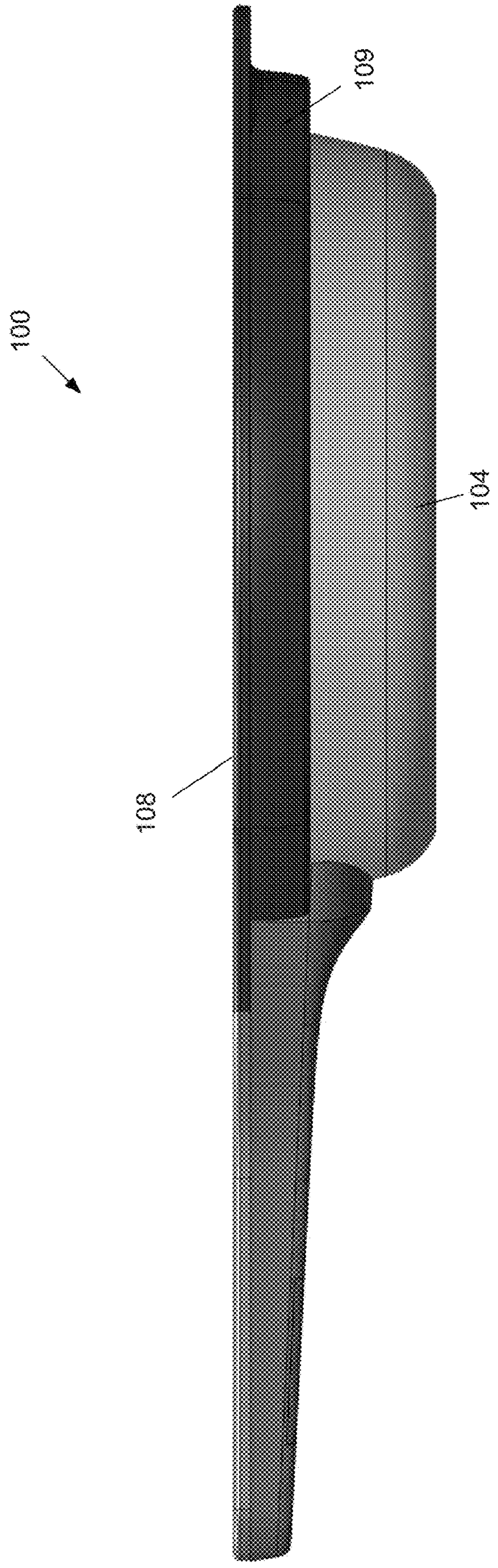
FIG. 7*a* is the elevational view of FIG. 7—illustrated with shading and edges—of the second side of the pan assembly 100.
Figure 7B:
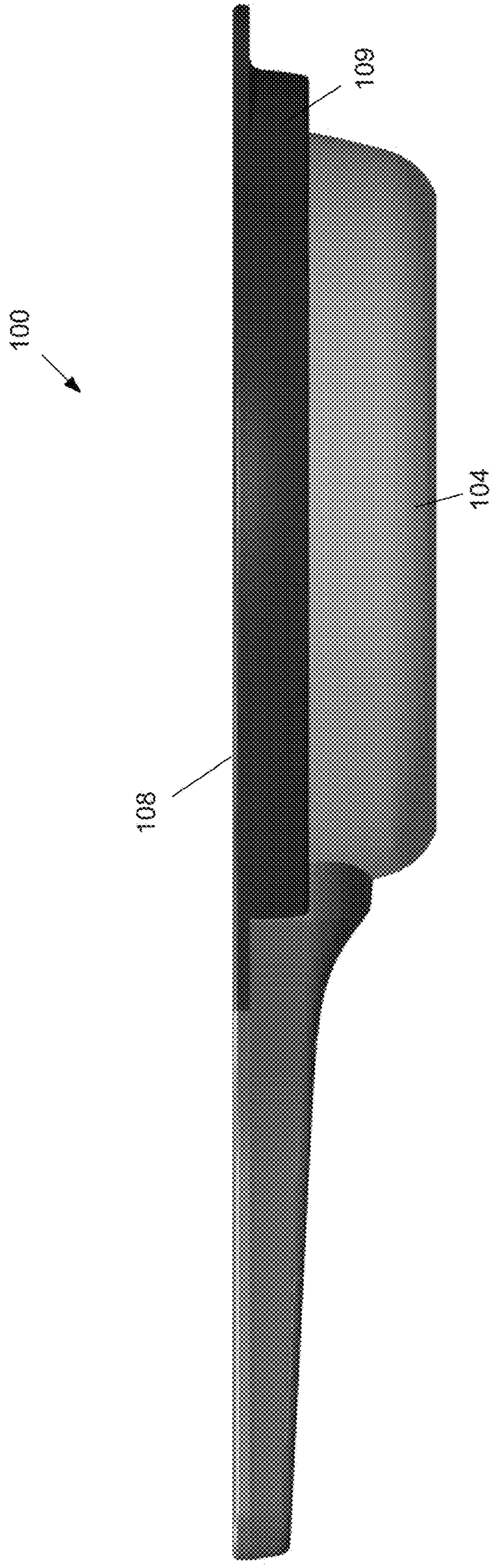
FIG. 7*b* is the elevational view of FIG. 7—illustrated with shading—of the second side of the pan assembly 100.

Additionally, FIG. 7*a* is the elevational view of FIG. 7—illustrated with shading and edges—of the second side of the pan assembly 100. FIG. 7*b* is the elevational view of FIG. 7—illustrated with shading—of the second side of the pan assembly 100.

Figure 8:
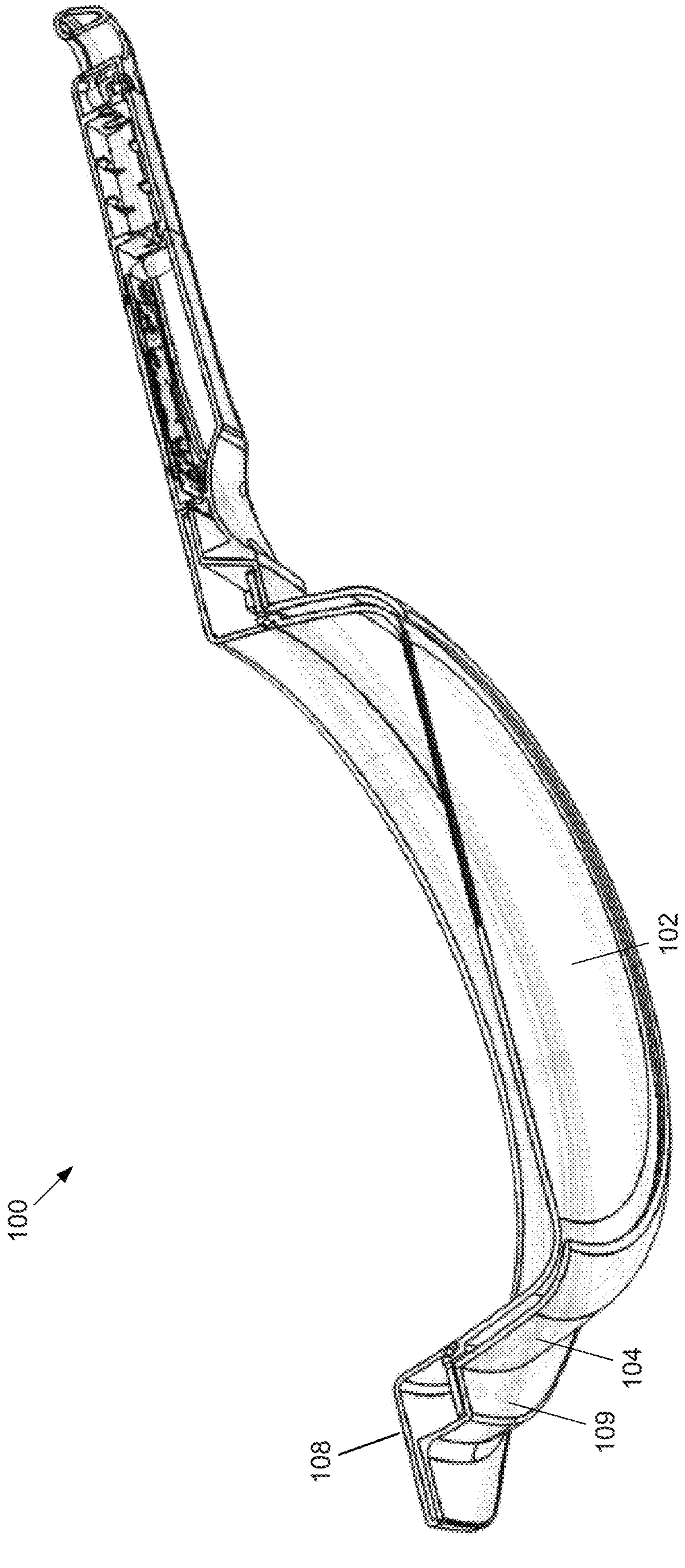
FIG. 8 is a perspective, cross-sectional view of the pan assembly 100.
Figure 9:
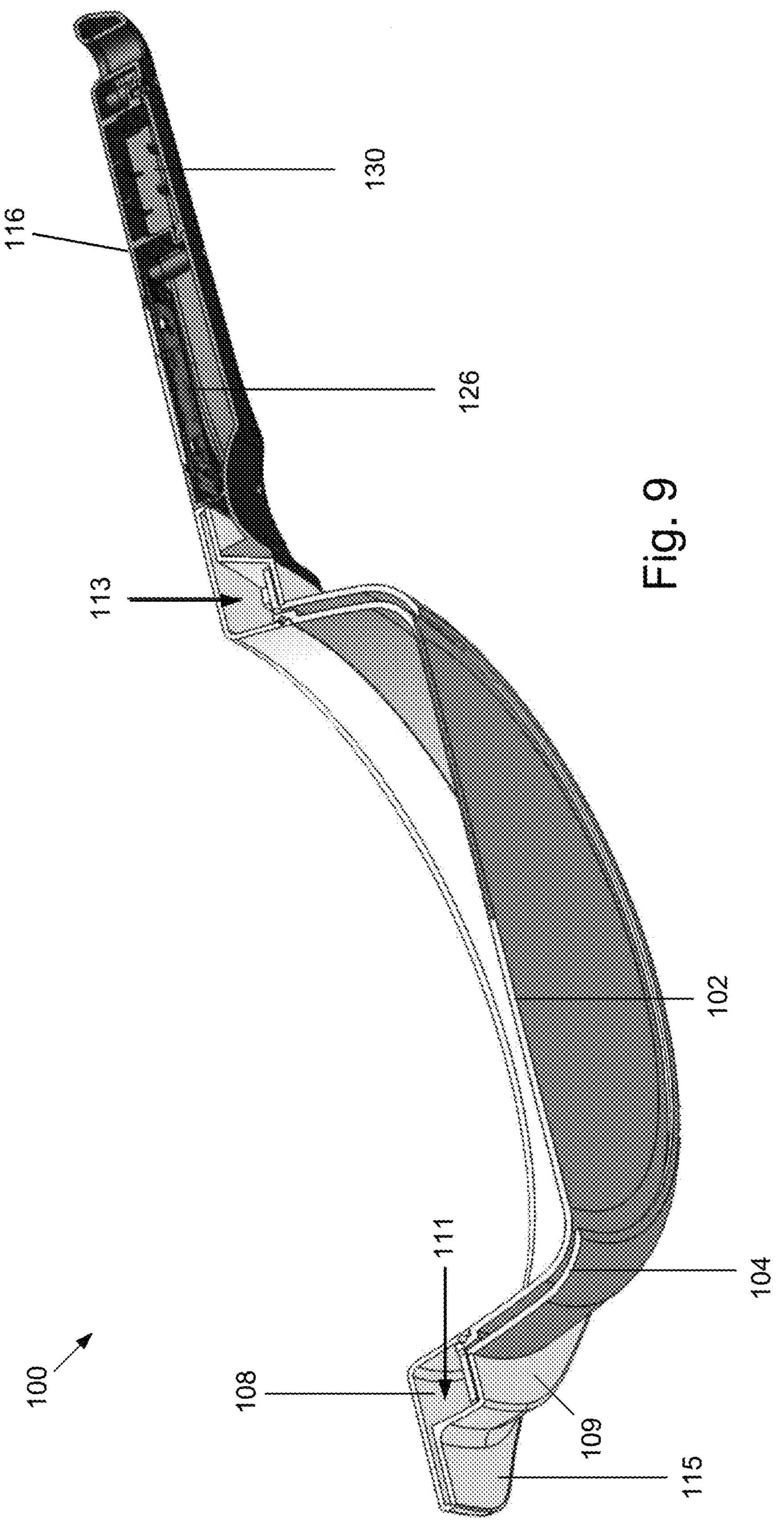
FIG. 9 is the perspective, cross-sectional view of FIG. 8—illustrated with shading and edges—of the pan assembly 100.
Figure 10:
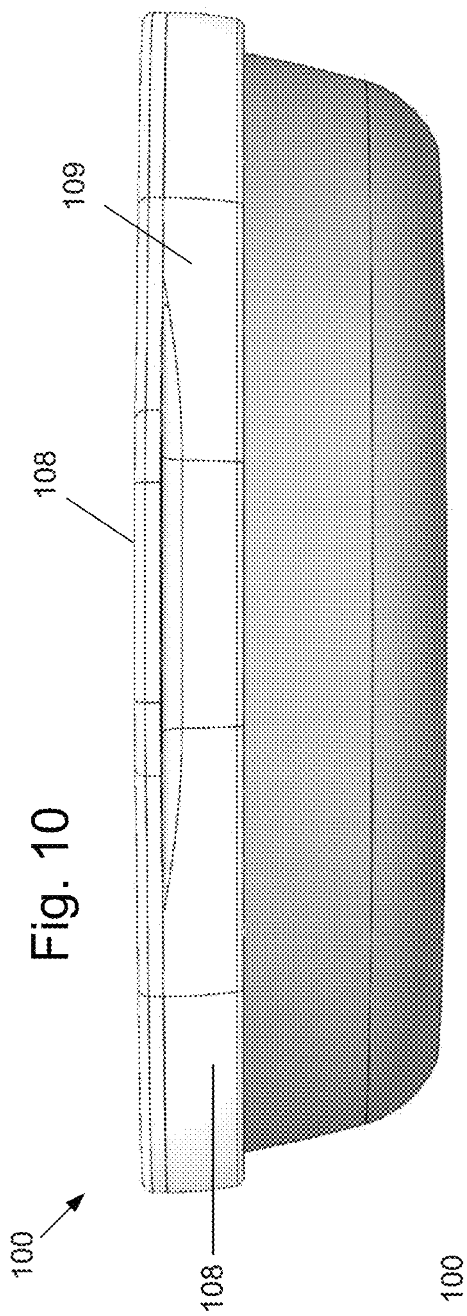
FIG. 10 is another elevational view—illustrated with shading and edges—of the front of the pan assembly 100.

FIG. 8 is a perspective, cross-sectional view of the pan assembly 100. FIG. 9 is the perspective, cross-sectional view of FIG. 8—illustrated with shading and edges—of the pan assembly 100, and FIG. is another elevational view—illustrated with shading and edges—of the front of the pan assembly 100. As shown in FIG. 9, an upper rim component 108 of the pan assembly 100 and a collar component 109 of the pan assembly 100 define a space in which the load cells are contained, include area 111 and area 113 on opposite sides of the pan assembly 100. The upper rim component 108 and collar component 109 also define a helper handle 115, as shown in FIG. 9, which helper handle 115 is on the opposite side of the pan assembly from a handle portion 116.

Figure 11:
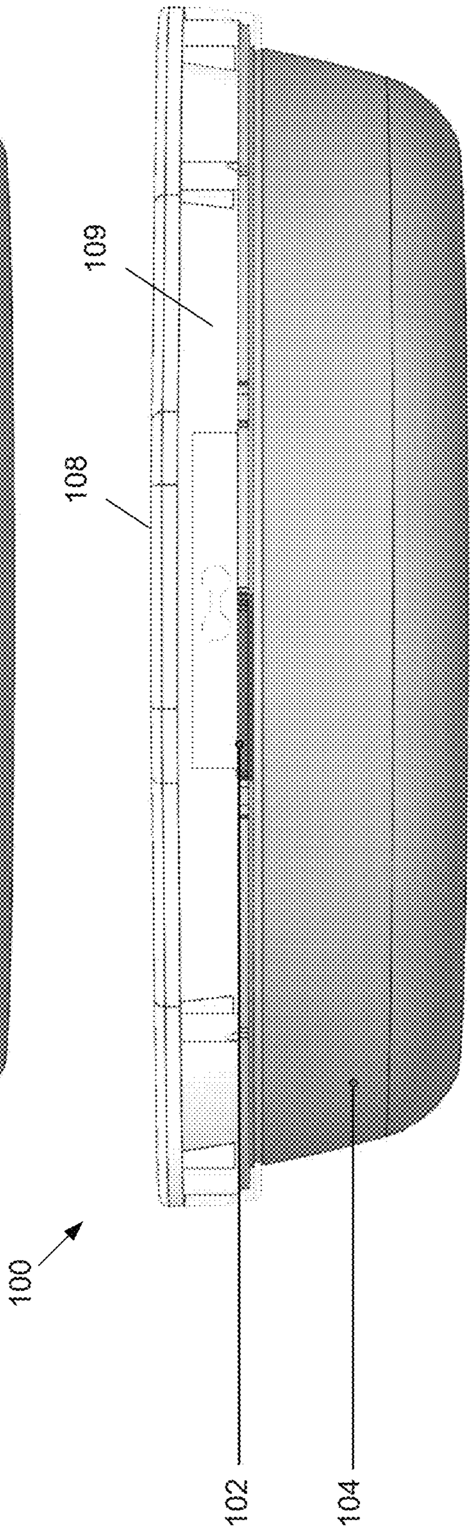
FIG. 11 is another elevational view—illustrated with shading and edges—of the front of the pan assembly 100, wherein the shrouding is illustrated transparently.

FIG. 11 is another elevational view—illustrated with shading and edges—of the front of the pan assembly 100, wherein the shrouding is illustrated transparently.

Figure 12:
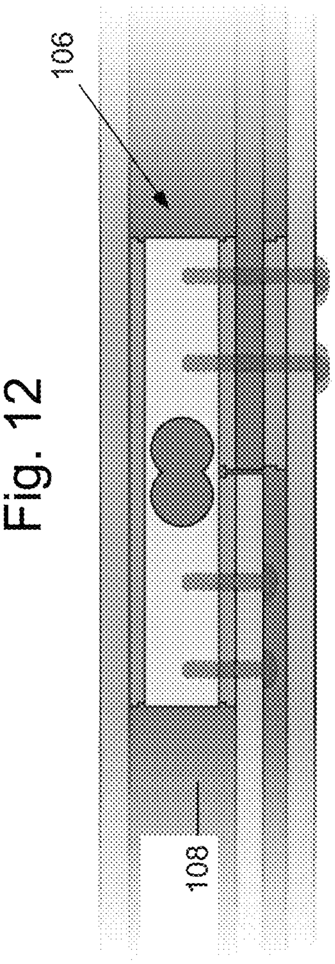
FIG. 12 is a schematic illustration of a load cell interconnecting an inner pan and an outer pan, wherein the load cell is in a first state.
Figure 13:
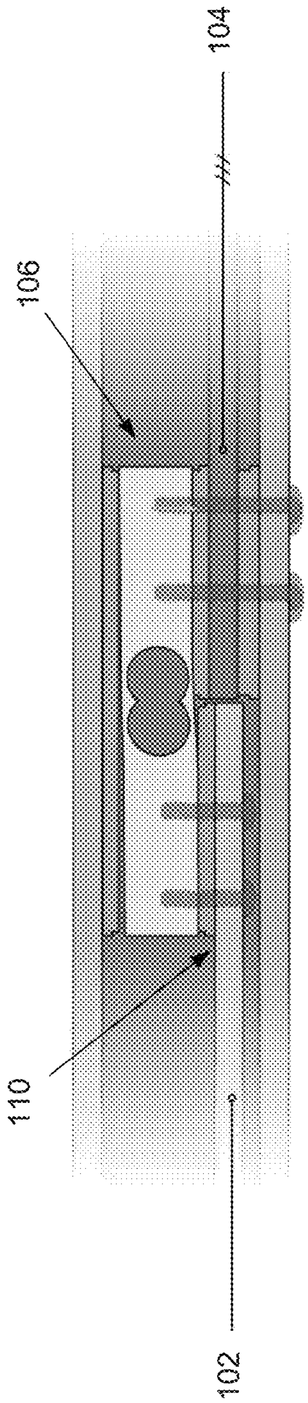
FIG. 13 is the schematic illustration of FIG. 12 of the load cell interconnecting the inner pan and the outer pan, wherein the load cell is in a second state in which it is under strain from shearing forces resulting from a mass that has been added onto the inner pan resulting in a downward pull on the bottom portion of the load cell that is secured to the inner pan.

FIG. 12 is a schematic illustration of a load cell 106 interconnecting the inner pan 102 and the outer pan 104, wherein the load cell 106 is in a first state. The upper rim member 108 shrouds the electrical wires and components including the load cell 106. Furthermore, FIG. 13 is the schematic illustration of FIG. 12 of the load cell 106 interconnecting the inner pan 102 and the outer pan 104, wherein the load cell 106 is in a second state. In the second state, the load cell 106 is under strain from shearing forces resulting from a mass that has been added onto the inner pan 102 that results in a downward pull on the bottom portion of the load cell 106 that is secured to the inner pan 102.

Figure 14:
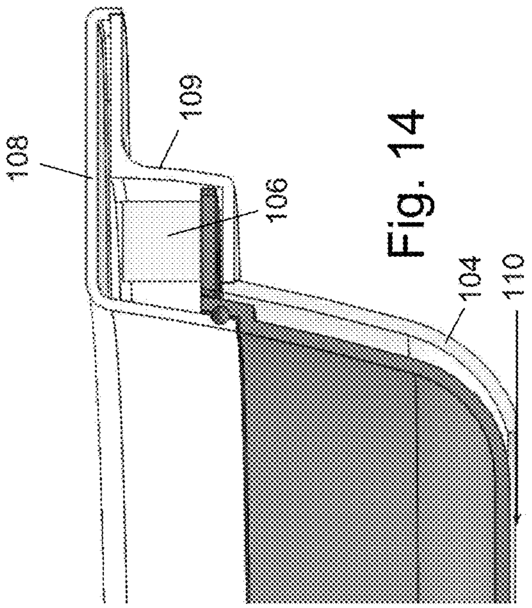
FIG. 14 is a partial elevational view in cross section of the pan assembly 100, wherein the pan is in a resting configuration (no mass has been placed onto the surface of the inner pan).

FIG. 14 is a partial elevational view in cross section of the pan assembly 100, wherein the pan assembly 100 is in a resting configuration (no mass has been placed onto the surface of the inner pan 102).

Figure 15:
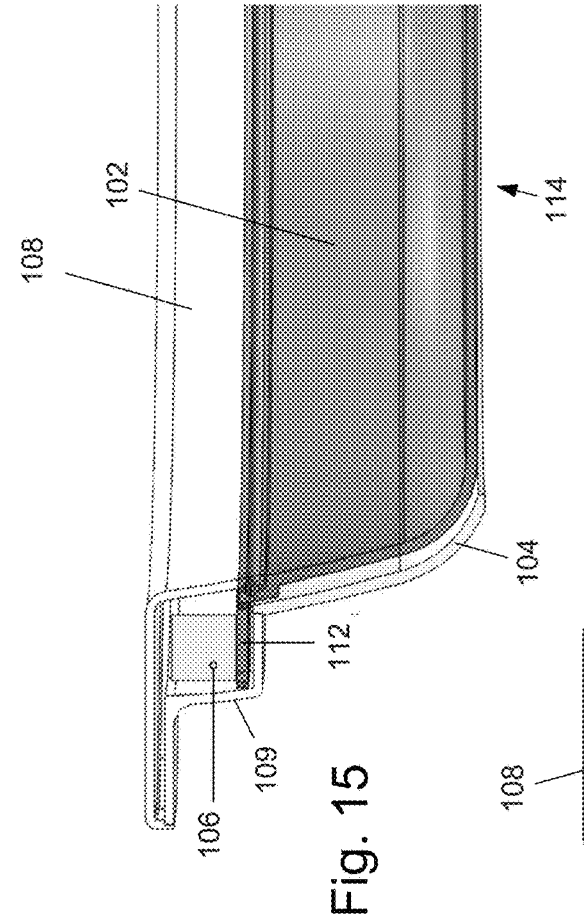
FIG. 15 is another partial elevational view in cross section of the pan assembly 100.
Figure 16:
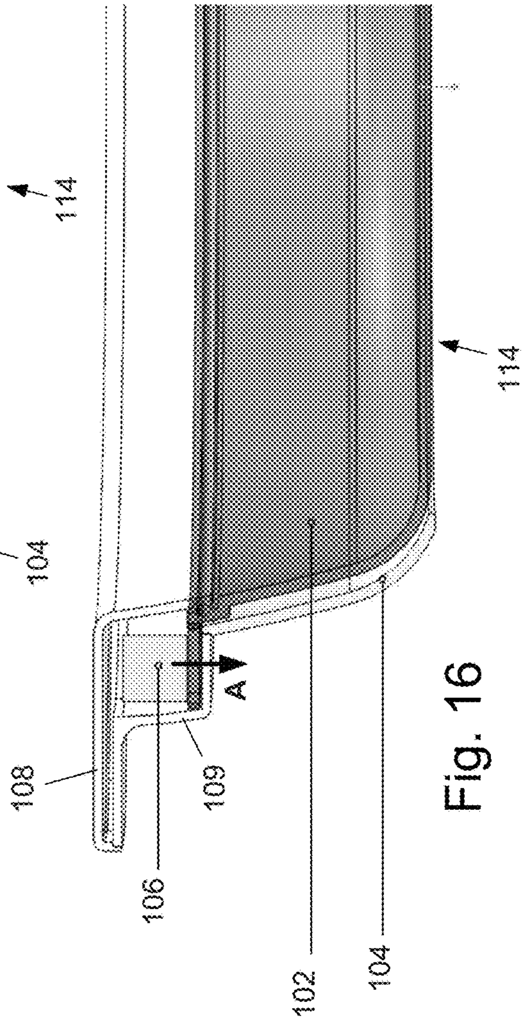
FIG. 16 is the partial elevational view in cross section of FIG. 15 in which a mass (not shown) has been placed onto the surface of the inner pan to create a force downwardly pulling on the load cell (as represented by the arrow).

FIG. 15 is another partial elevational view in cross section of the pan assembly 100 showing the load cell 106 connected to an inner pan flange at 112. FIG. 16 is the partial elevational view in cross section of FIG. 15 in which a mass (not shown) has been placed onto the surface of the inner pan 102 to create a force downwardly pulling on the load cell 106 (as represented by the arrow A). The inner pan 102 is suspended within the outer pan 104 and is configured to measure weight of one or more items placed within the pan assembly 100 for cooking. The weight is measured with load cells 106 by which the inner pan 102 is suspended within the outer pan 104. Preferably, the inner pan 102 is suspended within the outer pan 104 by the load cells 106, and the inner pan 102 is connected to the outer pan 104 only by the load cells 106 as shown in the cross-sectional views of FIG. 9 and FIGS. 14-16. Furthermore, as shown in FIGS. 14-16, an opening 114 is defined in the outer pan 104 by which the bottom surface of the inner pan 102 is exposed for heating, with a gap or gap of 1 to 2 millimeters extending between the bottom surface of the inner pan 102 and the bottom surface of the outer pan 104, as indicated at 110 in FIG. 14.

Figure 17:
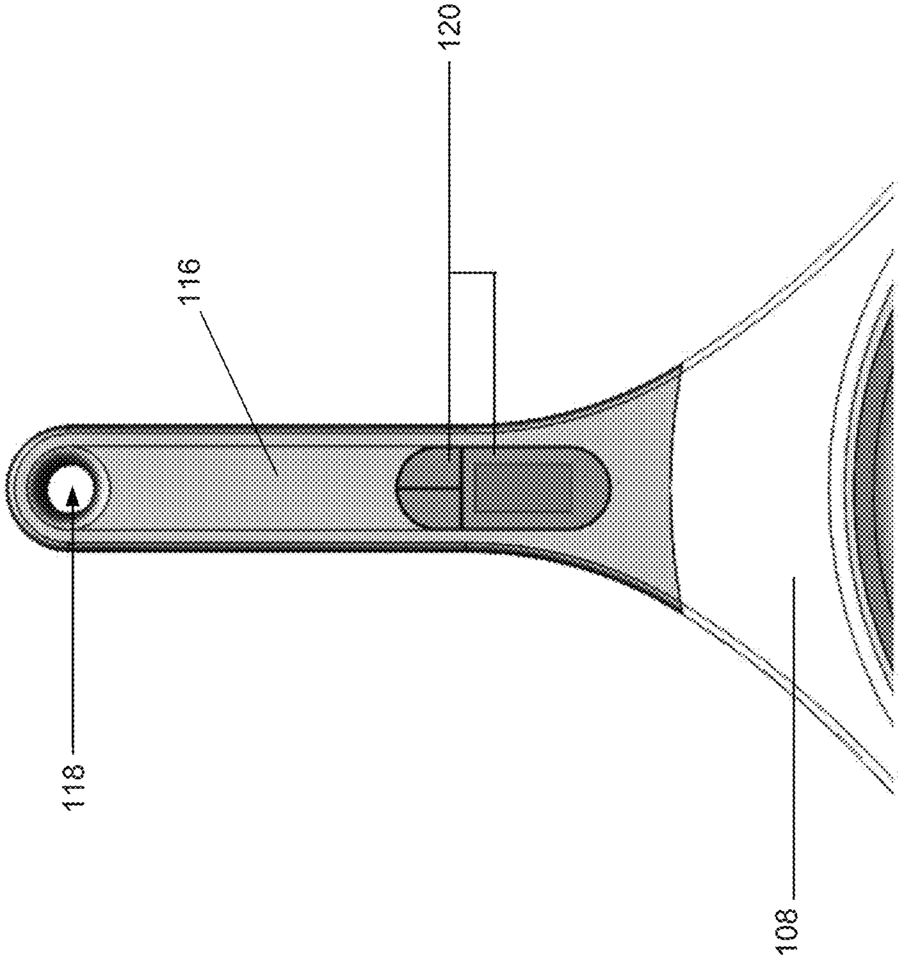
FIG. 17 is a top plan view of the handle portion of the pan assembly 100.

FIG. 17 is a top plan view of the handle portion 116 of the pan assembly 100. As shown in FIG. 17, the handle portion 116 defines an opening 118 extending therethrough for hanging of the pan when not in use, and a water resistant protective cover 120 extending over buttons and a display.

Figure 18:
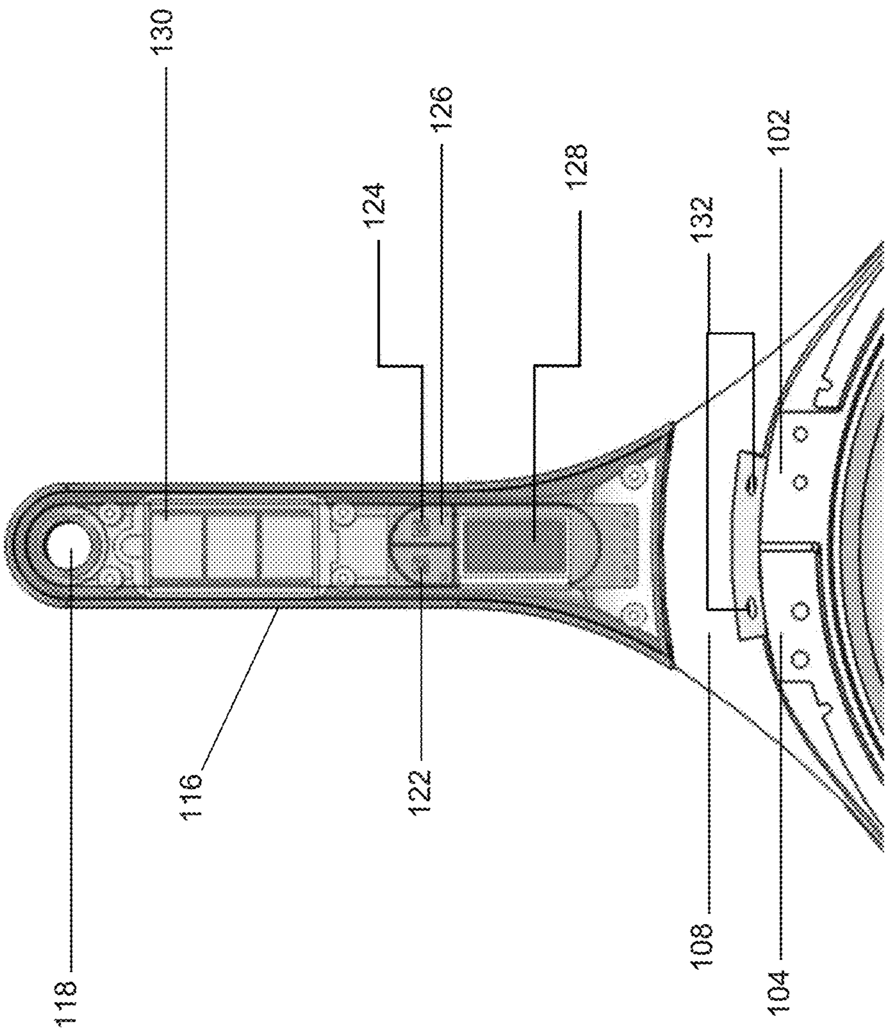
FIG. 18 is the top plan view of the handle portion of FIG. 17 wherein outer portions of the pan assembly 100 are omitted to reveal inner structure and components.
Figure 19:
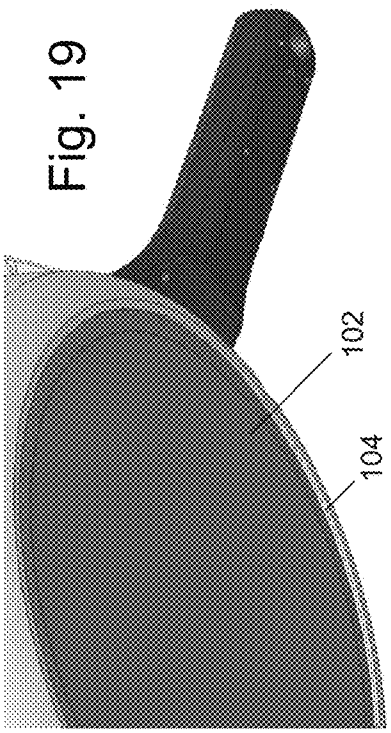
FIG. 19 is a partial perspective view of the bottom of the pan assembly 100 illustrating a location of a temperature sensor.

FIG. 18 is the top plan view of the handle portion of FIG. 17, wherein outer portions of the pan assembly 100 are omitted to reveal inner structure and components including: buttons 122,124; a printed circuit board (PCB) 126; an OLED screen 128; a battery compartment 130; and the opening 118 for hanging the pan assembly 100. Mounting points 132 for attaching the handle portion 116 are also shown. FIG. 19 is a partial perspective view of the bottom of the pan assembly 100.

Figure 20:
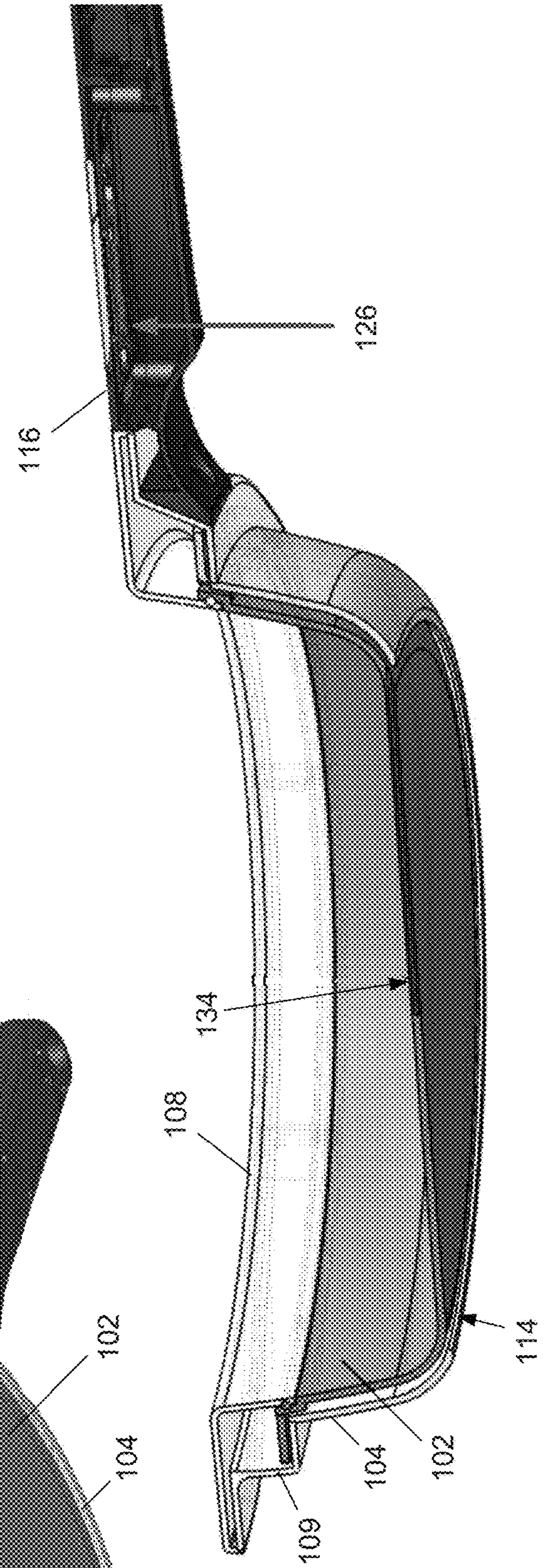
FIG. 20 is another partial perspective view in cross section of the pan assembly 100 illustrating a location of a channel for a temperature sensor as well as printed circuit board (PCB) located within the handle of the pan assembly 100.

FIG. 20 is another partial perspective view in cross section of the pan assembly 100 illustrating a location of a channel 134 formed in the bottom of the inner pan 102 for a temperature sensor. FIG. 20 also illustrates the PCB 126 located within the handle portion 116 of the pan assembly 100.

Figure 21:
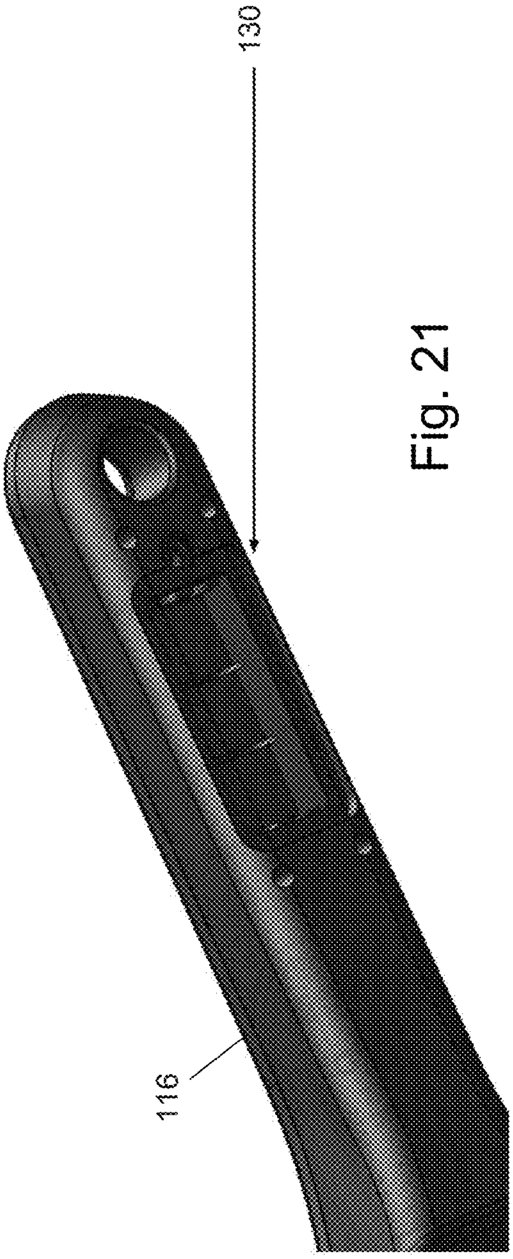
FIG. 21 is a perspective view of a bottom of the handle of the pan assembly 100 in which a cover for a compartment for holding batteries has been removed.

FIG. 21 is a perspective view of a bottom of the handle portion 116 of the pan assembly 100 in which a cover of the battery compartment 130 for holding batteries has been removed.

Figure 22:
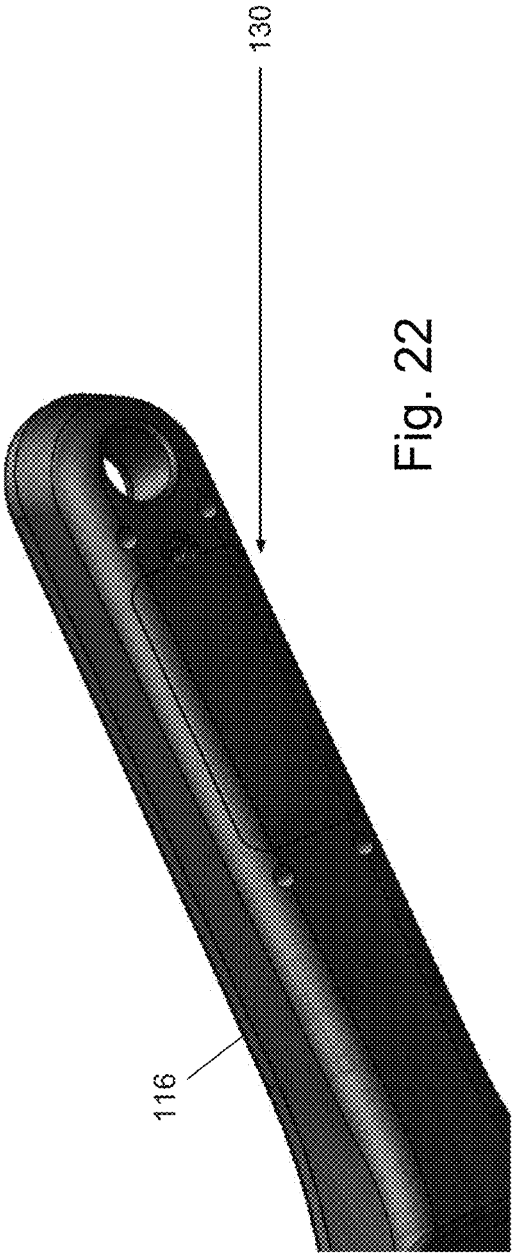
FIG. 22 is the perspective view of FIG. 21 wherein the cover has been reattached to the handle of the pan assembly 100 for enclosing the compartment.

FIG. 22 is the perspective view of FIG. 21 wherein the cover of the battery compartment 130 has been reattached to the handle portion 116 of the pan assembly 100.

Figure 23:
FIG. 23 is a closeup view of the screen of the handle of the pan assembly 100.

FIG. 23 is a closeup view of the screen 128 of the handle portion 116 of the pan assembly 100. Elastomeric membranes cover buttons and the screen for waterproofing. Pressing the temperature/power button for three seconds preferably powers off the electronics of the pan assembly 100, and pressing the tare button for three seconds preferably sets the weight allowance made for weighing a mass to be placed into the inner pan 102.

Figure 24:
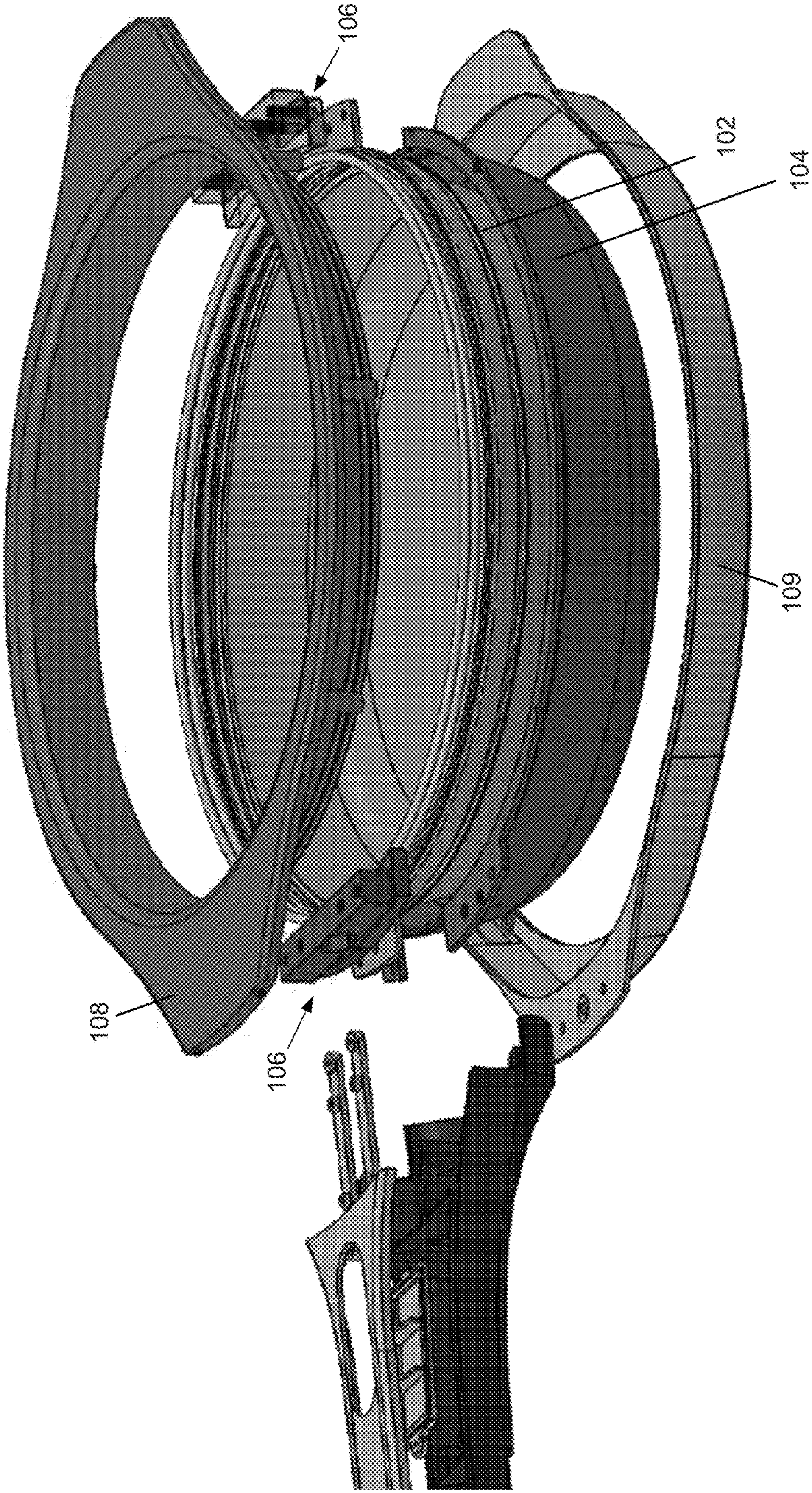
FIG. 24 is an exploded view of components of the pan assembly 100.
Figure 25:
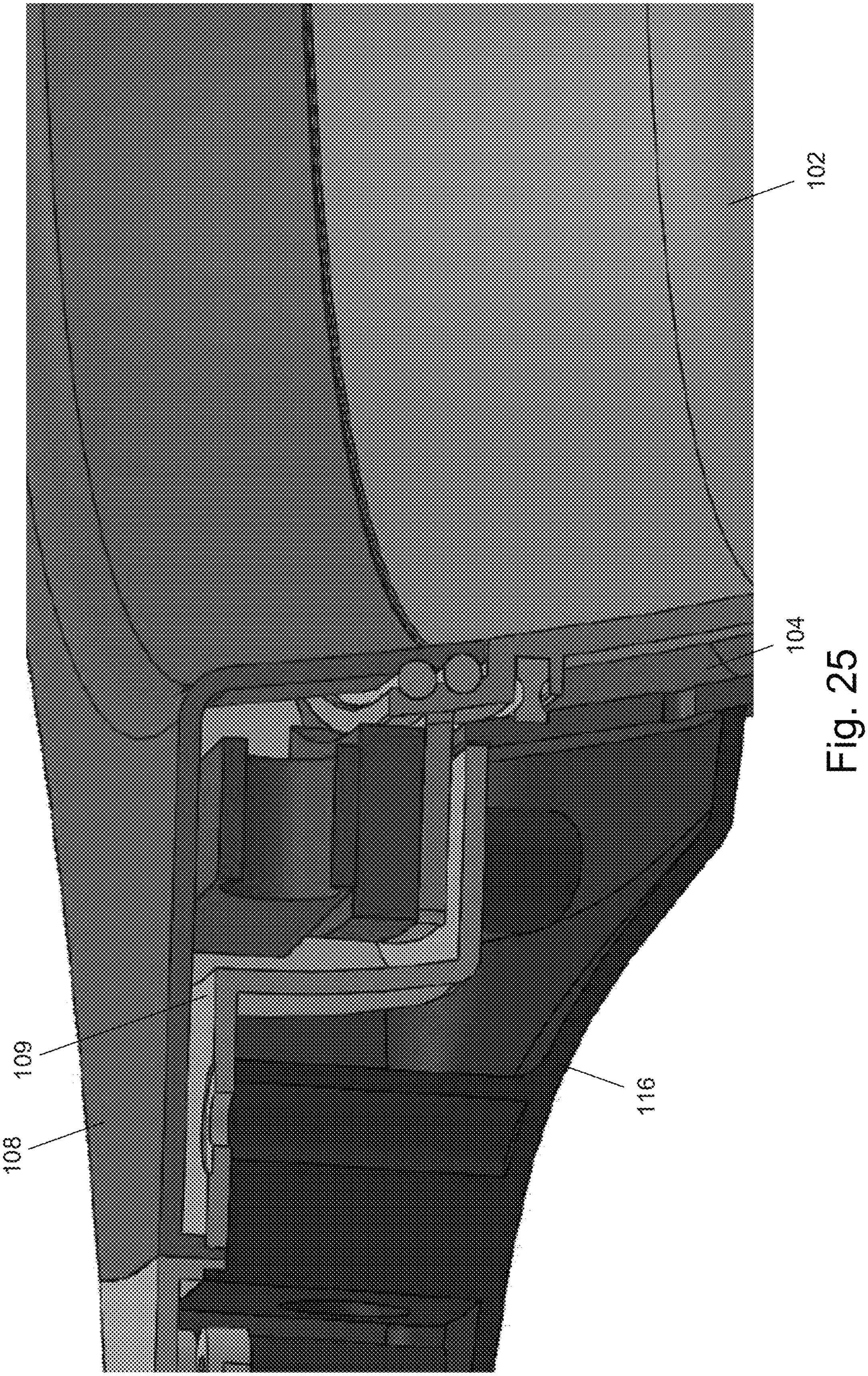
FIG. 25 is a partial cross-sectional view of the components of FIG. 24 when assembled together.
Figure 26:
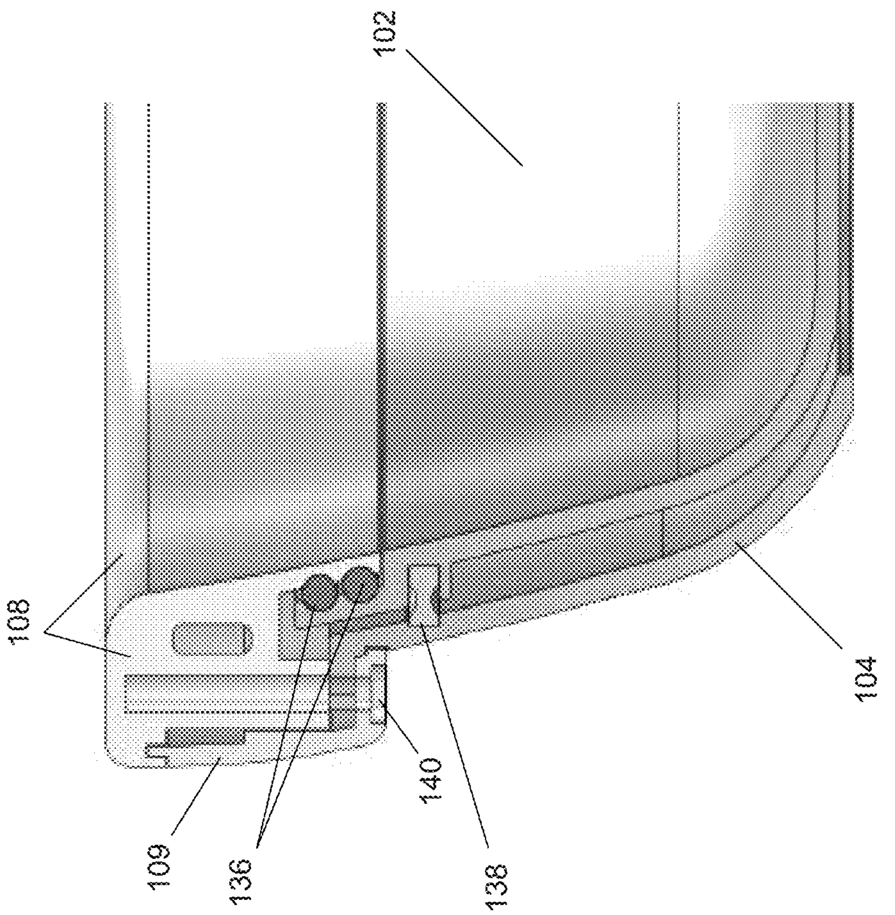
FIG. 26 is a similar partial cross-sectional view as that of FIG. 25 which shows sealing solution in accordance with one or more aspects and features of the invention.

FIG. 24 is an exploded view of components of the pan assembly 100. FIG. 25 is a partial cross-sectional view of the components of FIG. 24 when assembled together, and FIG. 26 is a similar partial cross-sectional view as that of FIG. 25 which shows a sealing solution in accordance with one or more aspects and features of the invention. As disclosed in FIGS. 24 and 25, the upper portions of the inner pan 102 and outer pan 104 together with the load cells 106 are collectively shrouded by and contained within the upper rim component 108 and a collar component 109. Furthermore, waterproofing ensures the electronics contained in this cookware product remain untouched by elements such as debris and water.

The sealing solution illustrated in FIG. 26 comprises two O-rings 136 and a secondary seal 138 implemented in the form of an extruded "X" or "dog-bone" profile, which geometry allows downward actuation flexibility with minimal resistance against the load in the inner pan for maintaining accuracy of the load cells. The sealing solution protects the electronics from ingress without affecting or influencing the load cells. The lack of a seal would invite debris particles when cooking with the pan assembly and water when washing or rinsing the pan assembly.

FIG. 26 further illustrates the attachment of the upper rim component 108 and collar component 109 using a fastener 140, with an upper portion of the outer pan 104 sandwiched therebetween.

Additional disclosure of an embodiment of cookware in accordance with one or more aspects and features of the invention is found in Appendix A, which is incorporated herein by reference; and additional disclosure of prototypes of cookware in accordance with one or more aspects and features of the invention is found in Appendix B, which is incorporated herein by reference.

It will be appreciated from the foregoing disclosure including the drawings that in preferred embodiments the inner pan is suspended exclusively by the load cells. In other words, the load cells bridge or couple together the outer and inner pan assemblies. The force applied to the load cell is in a downward direction. In the preferred prototypes, the inner pan assembly is screwed to the load cells, and it not secured or fastened to anything else. The inner pan assembly is suspended by and thereby "floats" on the load cells so as to function as a scale. The inner pan does not touch the outer pan assembly at all. The inner pan assembly attaches to the load cell and suspends itself to receive weight of items placed within the pan for cooking.

The outer pan assembly is screwed to the other side of the load cell. The load cells connect the two pans together and the assembly and then the bottom plastic outer ring is slid on and into place aligning the mounting holes of the outer pan with the plastic ring. The bottom side of the handle is then bolted to the double pan and plastic ring assembly linking them together. Then the top ring and handle top are bolted on to complete the cookware assembly.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A pan assembly comprising:

an inner pan;

an outer pan;

two load cells, each load cell comprising a strain gauge weight sensor;

a temperature probe;

an electronic display screen;

a power button;

a tare button;

a measurement toggle button;

a battery compartment;

a handle comprising an opening defined therethrough dimensioned and positioned for hanging of the pan assembly by the opening;

wherein the inner pan and outer pan are coupled together and positioned and dimensioned such that an exterior bottom of the inner pan is less than two millimeters from an exterior bottom of the pan assembly;

wherein the two load cells are positioned and configured to measure a weight or mass of objects in the inner pan;

wherein the temperature probe is configured to measure a temperature of the inner pan;

wherein the tare button is configured to zero out measurement with the two load cells;

wherein the electronic display screen is configured to display a weight or mass reading based on a weight or mass measurement by the load cells;

wherein the electronic display screen is configured to display a temperature reading based on a temperature measurement by the temperature probe; and wherein the measurement toggle button is configured to toggle between display of a temperature reading and display of a weight or mass reading.

2. The pan assembly of claim 1, wherein the pan assembly is configured to display a temperature reading on a plurality of scales.

3. The pan assembly of claim 1, wherein the pan assembly is configured to display a temperature reading on a Celsius scale.

4. The pan assembly of claim 1, wherein the pan assembly is configured to display a temperature reading on a Fahrenheit scale.

5. The pan assembly of claim 1, wherein the pan assembly is configured to display a weight or mass reading in a plurality of units.

6. The pan assembly of claim 1, wherein the pan assembly is configured to display a weight or mass reading in ounces.

7. The pan assembly of claim 1, wherein the pan assembly is configured to display a weight or mass reading in pounds.

8. The pan assembly of claim 1, wherein the pan assembly is configured to display a weight or mass reading in grams.

9. The pan assembly of claim 1, wherein the pan assembly includes a scale or unit toggle button for toggling between different scales or units.

10. The pan assembly of claim 1, wherein the pan assembly comprises a plastic perimeter surrounding a cooking area of the pan assembly which houses electrical wires.

* * * * *